United States Patent
Rambo

(10) Patent No.: US 12,253,025 B1
(45) Date of Patent: Mar. 18, 2025

(54) DE-ICE SYSTEM AND APPARATUS FOR TURBINE ENGINES

(71) Applicant: General Electric Company, Schenectady, NY (US)

(72) Inventor: Jeffrey Douglas Rambo, Mason, OH (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 18/588,257

(22) Filed: Feb. 27, 2024

(51) Int. Cl.
| | |
|---|---|
| F02C 7/047 | (2006.01) |
| B64D 15/00 | (2006.01) |
| F02C 3/30 | (2006.01) |
| F02C 6/18 | (2006.01) |
| F02C 7/143 | (2006.01) |
| F02C 7/18 | (2006.01) |
| F02K 3/10 | (2006.01) |

(52) U.S. Cl.
CPC .............. *F02C 7/047* (2013.01); *B64D 15/00* (2013.01); *F02C 3/30* (2013.01); *F02C 3/305* (2013.01); *F02C 6/18* (2013.01); *F02C 7/1435* (2013.01); *F02C 7/18* (2013.01); *F02K 3/10* (2013.01); *F05D 2260/213* (2013.01)

(58) Field of Classification Search
CPC . F28F 17/00; F28F 19/006; F23D 2021/0021; F28D 2021/0026; B64D 15/00; B64D 15/04; F02K 3/10; F02K 3/30; F02K 3/305; F02C 7/047; F02C 7/1435; F02C 7/18; F02C 6/18
See application file for complete search history.

(56) References Cited

U.S. PATENT DOCUMENTS

| | | | |
|---|---|---|---|
| 3,557,557 A | 1/1971 | Prachar | |
| 5,423,174 A | 6/1995 | Mouton | |
| 6,460,353 B2 * | 10/2002 | Udobot | F28D 9/0062 62/275 |
| 6,505,472 B1 | 1/2003 | Cheng et al. | |
| 9,945,247 B2 | 4/2018 | Appukuttan et al. | |
| 10,100,733 B2 | 10/2018 | O'Toole et al. | |
| 10,173,780 B2 | 1/2019 | Mackin et al. | |
| 10,443,497 B2 | 10/2019 | Schenk | |
| 10,935,329 B2 | 3/2021 | Hanlon et al. | |
| 11,105,569 B2 * | 8/2021 | Pess | F28G 1/166 |
| 11,118,457 B2 * | 9/2021 | Ivakitch | F04D 29/58 |
| 11,365,647 B2 | 6/2022 | Marchaj | |
| 11,603,798 B1 | 3/2023 | Terwilliger et al. | |
| 11,635,022 B1 * | 4/2023 | Terwilliger | F02C 9/00 60/775 |

(Continued)

FOREIGN PATENT DOCUMENTS

| | | |
|---|---|---|
| EP | 1045219 A1 | 10/2000 |
| JP | 10184389 A * | 7/1998 |

*Primary Examiner* — Kyle Robert Thomas
(74) *Attorney, Agent, or Firm* — Dority & Manning, P.A.

(57) ABSTRACT

A turbine engine includes a turbomachine having a compressor section, a combustion section, and a turbine section in serial flow order and together defining a working gas flow path; a thermal system operable with the turbomachine; a heat exchanger in fluid communication with the thermal system; and a plurality of elongated delivery devices in fluid communication with the compressor section of the turbomachine. The plurality of elongated delivery devices are configured to deliver a fluid from the compressor section to a surface of the heat exchanger.

20 Claims, 8 Drawing Sheets

(56) References Cited

U.S. PATENT DOCUMENTS

| | | | |
|---|---|---|---|
| 11,753,993 B1* | 9/2023 | Terwilliger | F02C 3/22 |
| | | | 60/266 |
| 11,920,526 B1* | 3/2024 | Terwilliger | F02C 7/22 |
| 11,965,462 B2* | 4/2024 | Klingels | B64D 33/10 |
| 2021/0207500 A1* | 7/2021 | Klingels | F02C 3/305 |
| 2023/0286661 A1* | 9/2023 | Klingels | B64D 33/04 |

* cited by examiner

DE-ICE SYSTEM AND APPARATUS FOR TURBINE ENGINES

FIELD

The present disclosure relates to turbine engines including a de-icing system and apparatus.

BACKGROUND

Turbine engines generally include a fan and a core section arranged in flow communication with one another. A combustor is arranged in the core section to generate combustion gases for driving a turbine in the core section of the turbine engine.

Ice or frost may generate on components of such turbine engines, which may negatively impact engine operation. Systems and apparatuses for de-icing components of the engine while also providing ruggedization against damage are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
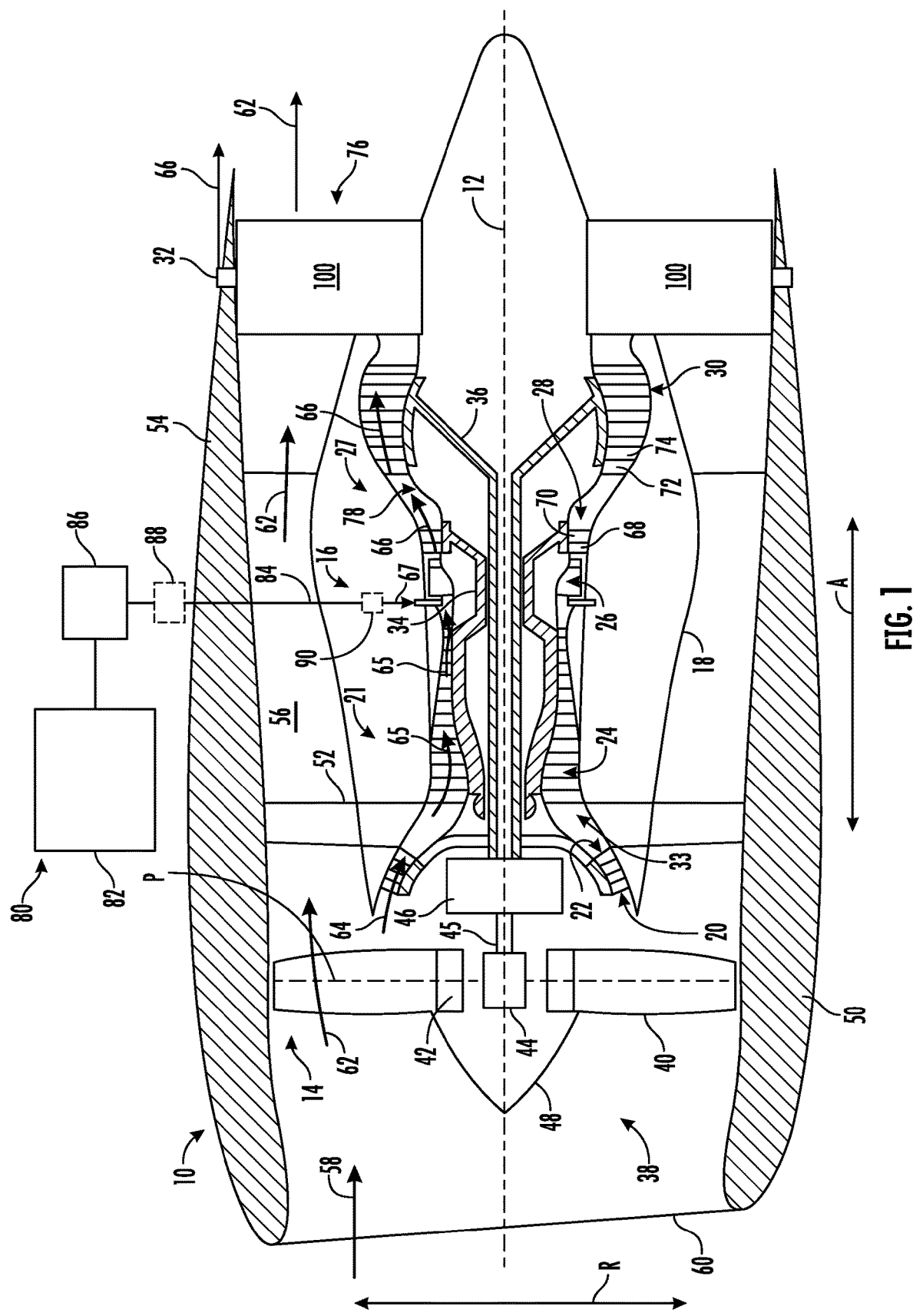
FIG. 1 is a schematic cross-sectional view of a turbine engine according to an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbine engine" refers to an engine having a turbomachine as all or a portion of its power source. Example turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, a "bypass ratio" of a turbine engine is a ratio of bypass air through a bypass of the turbine engine to core air through a core inlet of a turbomachine of the turbine engine. For example, the bypass ratio is a ratio of bypass air 62 entering the bypass airflow passage 56 to core air 64 entering the turbomachine 16.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the term "complementary" with reference to a radius of curvature of two radii of curvature, refers to the two radii of curvature being equal, or a larger of two the radii of curvature being no more than 10% greater than a smaller of the two radii of curvature.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (e.g., a first wall/surface contacting the one or more nonstructural layers, and the one or more nonstructural layers contacting a second wall/surface).

The present disclosure is generally related to systems and apparatuses for de-icing one or more components of turbine engines. Fluid associated with the turbine engine may be delivered to the one or more components by delivery devices to remove frost and ice formed on surfaces of the components and to prevent such frost and ice formation. The delivery devices may also provide ruggedization such that the delivery devices prevent damage to the associated components of the turbine engine.

Referring now to the drawings, FIG. 1 is a schematic cross-sectional view of a turbine engine 10 according to an exemplary embodiment of the present disclosure.

In at least one example embodiment, the turbine engine 10 includes a thermal system 100. As shown in FIG. 1, the turbine engine 10 has an axial direction A (extending parallel to a longitudinal centerline axis 12) and a radial direction R that is normal to the axial direction A. In general, the turbine engine 10 includes a fan section 14 and a turbomachine 16 disposed downstream from the fan section 14.

The turbomachine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor ("LPC") 22 followed downstream by a high-pressure compressor ("HPC") 24, a compressor section including a combustor 26, a turbine section 27, including a high-pressure turbine ("HPT") 28, followed downstream by a low-pressure turbine ("LPT") 30, and one or more core exhaust nozzles 32. A high-pressure ("HP") shaft 34 or a spool drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates. A low-pressure ("LP") shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the combustor 26, the turbine section 27, and the one or more core exhaust nozzles 32 together define a working gas flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbomachine 16. The nacelle 50 is supported relative to the turbomachine 16 by a plurality of circumferentially spaced outlet guide vanes 52. Moreover, a downstream section 54 of the nacelle 50 extends over an outer portion of the turbomachine 16 to define a bypass airflow passage 56 therebetween. The one or more core exhaust nozzles 32 may extend through the nacelle 50 and be formed therein. In this exemplary embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 and/or the fan section 14. As the volume of air 58 passes across the fan blades 40, a first portion of air (bypass air 62) is directed or routed into the bypass airflow passage 56, and a second portion of air (core air 64) is directed or is routed into the upstream section of the working gas flow path 33, or, more specifically, into the annular core inlet 20. The ratio between the first portion of air (bypass air 62) and the second portion of air (core air 64) is known as a bypass ratio. In some embodiments, the bypass ratio is greater than 18:1, enabled by the thermal system 100, detailed further below. The pressure of the core air 64 is then increased by the LPC 22, generating compressed air 65, and the compressed air 65 is routed through the HPC 24 and further compressed before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled by the thermal system 100, as detailed further below.

The combustion gases 66 are routed into the HPT 28 and expanded through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HP shaft 34, thus, causing the HP shaft 34 to rotate, thereby supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator 72 that are coupled to the outer casing 18 and LPT rotor blades 74 that are coupled to the LP shaft 36, thus, causing the LP shaft 36 to rotate, thereby supporting operation of the LPC 22 and rotation of the fan 38 via the gearbox assembly 46. One or more stages may be used in each of the HPT 28 and the LPT 30. The HPC 24 having a compression ratio in a range of 20:1 to 40:1 enables the HPT 28 to have a pressure expansion ratio in a range of 1.5:1 to 4:1 and the LPT 30 having a pressure expansion ratio in a range of 4.5:1 to 28:1.

The combustion gases 66 are subsequently routed through the one or more core exhaust nozzles 32 of the turbomachine 16 to provide propulsive thrust. Simultaneously with the flow of the core air 64 through the working gas flow path 33, the bypass air 62 is routed through the bypass airflow passage 56 before being exhausted from a fan bypass nozzle 76 of the turbine engine 10, also providing propulsive thrust. The HPT 28, the LPT 30, and the one or more core exhaust nozzles 32 at least partially define a hot gas path 78 for routing the combustion gases 66 through the turbomachine 16.

As noted above, the compressed air 65 (the core air 64) is mixed with the fuel 67 in the combustor 26 to generate a fuel and air mixture, and combusted, generating combustion gases 66 (combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel ($H_2$), and, while hydrogen-based fuel may include blends with hydrocarbon fuels, the fuel 67 used herein is preferably unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures. Additionally, the fuel 67 may include a liquefied natural gas (LNG).

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a pump 86 to induce the flow of the fuel 67 through the fuel delivery assembly 84 to the combustor 26. Steam injected directly into or upstream of the combustor 26 adds mass flow to the core air 64 such that less core air 64 is needed to produce the same amount of work through the turbine section 27. In this way, the pump 86 pumps the fuel 67 from the fuel tank 82, through the fuel delivery assembly 84, and into the combustor 26. The fuel system 80 and, more specifically, the fuel tank 82 and the fuel delivery assembly 84, either collectively or individually, may be a fuel source for the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26 and are located downstream of the pump 86. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel and convert the liquid hydrogen fuel into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the thermal system 100 in fluid communication with the one or more core exhaust nozzles 32 and the fan bypass nozzle 76. In at least one example embodiment, the thermal system 100 includes a steam system that extracts steam from the combustion gases 66 as the combustion gases 66 flow through the thermal system 100, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
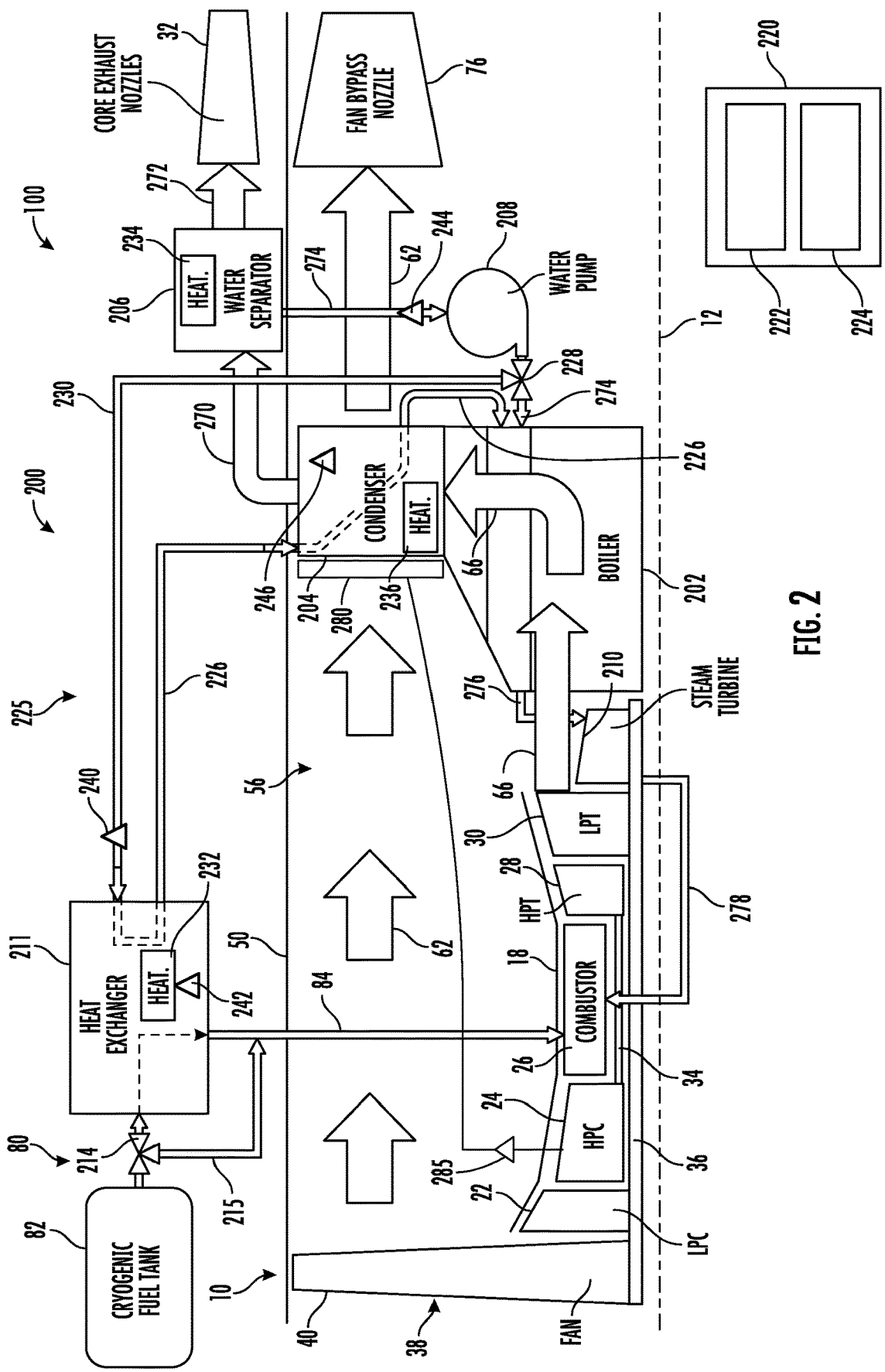
FIG. 2 is a schematic diagram of the turbine engine of FIG. 1 and a steam system with a thermal transport system according to an exemplary embodiment of the present disclosure.

FIG. 2 is a schematic diagram of the turbine engine 10 of FIG. 1 and the thermal system 100 with a thermal transport system 200 according to an exemplary embodiment of the present disclosure. The turbine engine 10 is shown schematically in FIG. 2 and some components are not shown in FIG. 2.

In at least one example embodiment, the thermal system 100 includes a boiler 202, a condenser 204, a water separator 206, a water pump 208, and a steam turbine 210. The boiler 202 is a heat exchanger that vaporizes liquid water from a water source to generate steam or water vapor, as detailed further below. The boiler 202 is thus a steam source. In particular, the boiler 202 is an exhaust gas-water heat exchanger. The boiler 202 is in fluid communication with the hot gas path 78 (FIG. 1) and is positioned downstream of the LPT 30. The boiler 202 is also in fluid communication with the water pump 208, as detailed further below. The boiler 202 can include any type of boiler or heat exchanger for extracting heat from the combustion gases 66 and vaporizing liquid water into steam or water vapor as the liquid water and the combustion gases 66 flow through the boiler 202.

The condenser 204 is a heat exchanger that further cools the combustion gases 66 as the combustion gases 66 flow through the condenser 204, as detailed further below. In particular, the condenser 204 is an air-exhaust gas heat exchanger. The condenser 204 is in fluid communication with the boiler 202 and, in this embodiment, is positioned within the bypass airflow passage 56.

In other example embodiments, the condenser 204 of the thermal system 100 may be positioned elsewhere and thermally connected to other cooling sources, such as being thermally connected to the fuel 67 to transfer heat to the fuel 67, particularly, when the fuel 67 is a cryogenic fuel such as hydrogen fuel or LNG fuel. The condenser 204 can include any type of condenser for condensing water from the exhaust (e.g., the combustion gases 66). Moreover, the thermal system 100 may be in fluid communication with the one or more core exhaust nozzles 32 to utilize waste heat, such as waste heat from the combustion gases 66, to heat the fuel 67 to a desired temperature for combustion.

The water separator 206 is in fluid communication with the condenser 204 for receiving cooled exhaust (combustion gases 66) having condensed water entrained therein. The water separator 206 is also in fluid communication with the one or more core exhaust nozzles 32 and with the water pump 208. The water separator 206 includes any type of water separator for separating water from the exhaust. For example, the water separator 206 can include a cyclonic separator that uses vortex separation to separate the water from the air. In such embodiments, the water separator 206 generates a cyclonic flow within the water separator 206 to separate the water from the cooled exhaust. In FIG. 2, the water separator 206 is schematically depicted as being in the nacelle 50, but the water separator 206 could be located at other locations within the turbine engine 10, such as, for example, radially inward of the nacelle 50, closer to the turbomachine 16. The water separator 206 may be driven to rotate by one of the engine shafts, such as the HP shaft 34 or the LP shaft 36. As noted above, the boiler 202 receives liquid water from a water source to generate steam or water vapor. In the embodiment depicted in FIG. 2, the condenser 204 and the water separator 206, individually or collectively, are the water source for the boiler 202.

The water pump 208 is in fluid communication with the water separator 206 and with the boiler 202. The water pump 208 is in fluid communication with the condenser 204 via the water separator 206. The water pump 208 may be any suitable pump, such as a centrifugal pump or a positive displacement pump. The water pump 208 directs the separated liquid water through the boiler 202 where it is converted back to steam. This steam is sent through the steam turbine 210 then injected into working gas flow path 33, such as into the combustor 26.

In operation, the combustion gases 66, also referred to as exhaust, flow from the LPT 30 into the boiler 202. The combustion gases 66 transfer heat into the water 274 (e.g., in liquid form) within the boiler 202, as detailed further below. The combustion gases 66 then flow into the condenser 204. The condenser 204 condenses the water 274 (e.g., in liquid form) from the combustion gases 66. The bypass air 62 flows through the bypass airflow passage 56 and over or through the condenser 204 and extracts heat from the combustion gases 66, cooling the combustion gases 66 and condensing the water 274 from the combustion gases 66, to generate an exhaust-water mixture 270. The bypass air 62 is then exhausted out of the turbine engine 10 through the fan bypass nozzle 76 to generate thrust, as detailed above. The condenser 204 thus may be positioned in bypass airflow passage 56.

The exhaust-water mixture 270 flows into the water separator 206. The water separator 206 separates the water 274 from the exhaust of the exhaust-water mixture 270 to generate separate exhaust 272 and the water 274. The exhaust 272 is exhausted out of the turbine engine 10 through the one or more core exhaust nozzles 32 to generate thrust, as detailed above. The boiler 202, the condenser 204, and the water separator 206 thus also define a portion of the hot gas path 78 (see FIG. 1) for routing the combustion gases 66, the exhaust-water mixture 270, and the exhaust 272 through the thermal system 100 of the turbine engine 10.

The water pump 208 pumps the water 274 (e.g., in liquid form) through one or more water lines (as indicated by the arrow for the water 274 in FIG. 2) and the water 274 flows through the boiler 202. As the water 274 flows through the boiler 202, the combustion gases 66 flowing through the boiler 202 transfer heat into the water 274 to vaporize the water 274 and to generate the steam 276 (e.g., vapor). The steam turbine 210 includes one or more stages of steam turbine blades (not shown) and steam turbine stators (not shown). The steam 276 flows from the boiler 202 into the steam turbine 210, through one or more steam lines (as indicated by the arrow for the steam 276 in FIG. 2), causing the steam turbine blades of the steam turbine 210 to rotate, thereby generating additional work in an output shaft (e.g., one of the core shafts) connected to the turbine blades of the steam turbine 210.

As noted above, the turbomachine 16 includes shafts, also referred to as core shafts, coupling various rotating components of the turbomachine 16 and other thrust producing components such as the fan 38. In the turbomachine 16 shown in FIG. 1, these core shafts include the HP shaft 34 and the LP shaft 36. The steam turbine 210 is coupled to one of the core shafts of the turbomachine 16, such as the HP shaft 34 or the LP shaft 36. In the illustrated embodiment, the steam turbine 210 is coupled to the LP shaft 36. As the steam 276 flows from the boiler 202 through the steam turbine 210, the kinetic energy of this gas is converted by the steam turbine 210 into mechanical work in the LP shaft 36. The reduced temperature steam (as steam 278) exiting the steam turbine 210 is then injected into the working gas flow path 33, such as into the combustor 26, upstream of the combustor 26, or downstream of the combustor 26. The steam 278 flows through one or more steam lines from the steam turbine 210 to the working gas flow path 33. The steam 278 injected into the working gas flow path 33 adds mass flow to the core air 64 such that less core air 64 is needed to produce the same amount of work through the turbine section 27. In this way, the thermal system 100 extracts additional work from the heat in exhaust gas that would otherwise be wasted. The steam 278 injected into the working gas flow path 33 is in a range of 20% to 50% of the mass flow through the working gas flow path 33.

The steam turbine 210 may have a pressure expansion ratio in a range of 2:1 to 6:1. The pressure expansion ratio is a ratio of the pressure at an inlet of the steam turbine 210 to the pressure at an exit of the steam turbine 210. The steam turbine 210 may contribute approximately 25% of the power to the LP shaft 36 (or to the HP shaft 34) when the thermal system 100 recovers approximately 70% of the water 274 and converts the water 274 into the steam 276. The steam turbine 210 has a pressure expansion ratio in a range of 2:1 to 6:1, the LPT 30 has a pressure expansion ratio in a range of 4.5:1 to 28:1, and the steam 278 contributes to 20% to 50% of the mass flow through the working gas flow path 33. The steam turbine 210 expands the steam 276, thereby reducing the energy of the steam 278 exiting the steam turbine 210 and reducing the temperature of the steam 278 to approximately a temperature of the compressed air 65 (see FIG. 1) that is discharged from the HPC 24. Such a configuration enables the steam 278 to reduce hot spots in the combustor 26 from the combustion of the fuel (e.g., in particular when the fuel is supercritical hydrogen or gaseous hydrogen).

The steam 278 injected into the working gas flow path 33 also enables the HPT 28 to have a greater energy output with fewer stages of the HPT 28 as compared to HPTs without the benefit of the present disclosure. For example, the additional mass flow from the steam 278 through the turbine section 27 helps to produce a greater energy output. In this way, the HPT 28 may only have one stage capable of sustainably driving a higher number of stages of the HPC 24 (e.g., 10, 11, or 12 stages of the HPC 24) due to the higher mass flow (resulting from the steam injection) exiting the combustor 26. The steam 278 that is injected into the working gas flow path 33 enables the HPT 28 to have only one stage that drives the plurality of stages of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

With less core air 64 (see FIG. 1) needed due to the added mass flow from the steam 276, the compression ratio of the HPC 24 may be increased as compared to HPCs without the benefit of the present disclosure. In this way, the HPC 24 has a compression ratio greater than 20:1. In some embodiments, the compression ratio of the HPC 24 is in a range of 20:1 to 40:1. Thus, the compression ratio of the HPC 24 is increased, thereby increasing the thermal efficiency of the turbine engine 10 as compared to HPCs and turbine engines without the benefit of the present disclosure. Further, the HPC 24 may have a reduced throat area due to the added mass flow in the turbomachine 16 provided by the steam 276, 278 injected into the turbomachine 16. Accordingly, the HPC 24 has a reduced size (e.g., outer diameter) and a reduced weight, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 includes one or more compressor bleed valves that are controlled to be opened to bleed a portion of the compressed air 65 (see FIG. 1) from the HPC 24. The one or more compressor bleed valves are preferably positioned between a fourth stage of the HPC 24 and a last stage of the HPC 24. The HPC stator vanes that are variable stator vanes, and the one or more compressor bleed valves, help to balance the air flow (e.g., the compressed air 65) through the stages of the HPC 24. Such a balance, in combination with the steam 278 injected into the working gas flow path 33, enables the number of stages of the HPC 24 to include ten to twelve stages for compression ratios to be greater than 20:1, and preferably in a range of 20:1 to 40:1.

The additional work that is extracted by the thermal system 100 and the steam 278 injected into the working gas flow path 33 enables a size of the turbomachine 16 (FIG. 1) to be reduced, thereby increasing the bypass ratio of the turbine engine 10, as compared to turbine engines without the benefit of the present disclosure. In this way, the turbine engine 10 has a bypass ratio greater than 18:1, preferably, in a range of 18:1 to 100:1, more preferably, in a range of 25:1 to 85:1, and, most preferably, in a range of 28:1 to 70:1. In this way, the thermal system 100 can enable an increased bypass ratio in which the turbine engine 10 can move a larger mass of air through the bypass, reducing the pressure ratio of the fan 38 and increasing the efficiency of the turbine engine 10 as compared to turbine engines without the benefit of the present disclosure.

The turbine engine 10 may also include an engine controller 220. The engine controller 220 is configured to operate various aspects of the turbine engine 10, including, in this embodiment, the water pump 208, a fuel bypass valve 214, a selector valve 228, a first heater 232, a second heater 234, and a third heater 236. The engine controller 220 may be a Full Authority Digital Engine Control (FADEC). In this embodiment, the engine controller 220 is a computing device having one or more processors 222 and one or more memories 224. The processor 222 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 224 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 224 can store information accessible by the processor 222, including computer-readable instructions that can be executed by the processor 222. The instructions can be any set of instructions or a sequence of instructions that, when executed by the processor 222, causes the processor 222 and the engine controller 220 to perform operations. In some embodiments, the instructions can be executed by the processor 222 to cause the processor 222 to complete any of the operations and functions for which the engine controller 220 is configured, as will be described further below. The instructions can be software written in any suitable programming language, or can be implemented in hardware. Additionally, and/or alternatively, the instructions can be executed in logically and/or virtually separate threads on the processor 222. The memory 224 can further store data that can be accessed by the processor 222.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The fuel 67 (FIG. 1) may be heated prior to injecting the fuel 67 into the combustor 26 for various reasons. Some fuels, such as hydrocarbon-based fuels may be heated, for example, to prevent ice formation or for performance benefits. Other fuels, such as cryogenic fuels, may be heated and vaporized (converted from a liquid state in which the cryogenic fuel is stored to a vapor state for combustion), prior to being injected into the combustor 26. As noted above, the embodiments discussed herein utilize a thermal transport system to transfer heat from the turbine engine 10 and to use that heat to help heat the fuel 67. More specifically, in the embodiments discussed herein, the water 274 is used as the heat transfer fluid to transfer heat from the thermal system 100 to the fuel 67 in the fuel system 80. The following discussion makes reference to cryogenic fuel and, more specifically, hydrogen fuel, but the thermal transport systems discussed herein may be applicable to other fuel systems.

The fuel tank 82 is configured to hold the hydrogen fuel at least partially within the liquid phase and is configured to provide hydrogen fuel to the fuel delivery assembly 84 substantially completely in the liquid phase, such as completely in the liquid phase. The fuel tank 82 has a fixed volume and contains a volume of the hydrogen fuel in the liquid phase (e.g., liquid hydrogen fuel). As the fuel tank 82 provides hydrogen fuel to the fuel delivery assembly 84 substantially completely in the liquid phase, the volume of the liquid hydrogen fuel in the fuel tank 82 decreases and the remaining volume in the fuel tank 82 is made up by, for example, hydrogen substantially completely in the gaseous phase (gaseous hydrogen). As used herein, the term "substantially completely" is used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 82 at very low (cryogenic) temperatures, and, thus, the fuel tank 82 may also be referred to herein as a cryogenic fuel tank. For example, the hydrogen fuel may be stored in the fuel tank 82 at about −253 degrees Celsius (twenty Kelvin) or less at atmospheric pressure, or at other temperatures and pressures to maintain the hydrogen fuel substantially completely in the liquid phase. In some embodiments, the hydrogen fuel may be stored in the fuel tank 82 at temperatures from −259 degrees Celsius (fourteen Kelvin) to −243 degrees Celsius (thirty Kelvin), and, more preferably, from −253 degrees Celsius (twenty Kelvin) to −243 degrees Celsius (thirty Kelvin). To store the hydrogen fuel in the liquid phase, the fuel tank 82 stores and maintains the hydrogen cryogenically and may be a cryostat. The fuel tank 82 may thus be, for example, a dual wall tank, including an inner vessel (e.g., an inner cryogenic liquid tank) and an outer vessel (e.g., a vacuum vessel). The inner vessel may be positioned within the outer vessel with a gap formed between the inner vessel and the outer vessel. To provide thermal isolation for the inner vessel, the gap may be under vacuum. The gap may include a void space or be an entirely void space, but, alternatively, the gap may include multi-layer insulation (MLI), such as aluminized polyester films (e.g., aluminized Mylar®), for example.

The turbine engine 10 shown in FIG. 2 includes the thermal transport system 200 that may be used to transfer heat from the thermal system 100 to the fuel system 80. The thermal transport system 200 includes a fuel heat exchanger 211 fluidly connected to the fuel delivery assembly 84. The fuel heat exchanger 211 of this embodiment is a fuel/water heat exchanger, and as the fuel 67 flows from the fuel tank 82 to the combustor 26, the fuel 67 absorbs (receives) heat from the water 274 of the thermal system 100 and is heated. In some example embodiments, the fuel heat exchanger 211 may be one of the vaporizers 88 discussed above. Additionally, the fuel heat exchanger 211 may be in addition to the vaporizers 88. The fuel heat exchanger 211 may be any suitable heat exchanger, including, for example, a plate heat exchanger or a tubular heat exchanger, such as a tube and shell heat exchanger. The fuel heat exchanger 211 thus includes a fluid flow path for the heat transfer fluid.

There may be instances when heating the fuel 67 with the water 274 is not desirable or when removing heat from the water 274 is not desirable. Such conditions include startup, as discussed further below, when the water 274 is not sufficiently hot enough to flow through the fuel heat exchanger 211 and to heat the fuel 67. Accordingly, the fuel system 80 of this embodiment includes a fuel bypass line 215 (i.e., a fuel bypass flow path) that fluidly connects a portion of the fuel delivery assembly 84 upstream of the fuel heat exchanger 211 with a portion of the fuel delivery assembly 84 downstream of the fuel heat exchanger 211, thus, bypassing the fuel heat exchanger 211. The fuel system 80 is, thus, selectively operable to redirect the fuel 67, or a portion thereof, and to bypass the fuel heat exchanger 211. The fuel bypass line 215 includes a fuel bypass valve 214 located in the fuel bypass line 215 and the fuel delivery assembly 84. The fuel bypass valve 214 is operable to open and to direct the fuel 67 through the fuel bypass line 215, bypassing the fuel heat exchanger 211, and, thus, the fuel bypass valve 214 selectively operates the fuel system 80 to bypass the fuel heat exchanger 211. The fuel bypass valve 214 may be any suitable valve, including, for example, a three-way valve. The fuel bypass valve 214 may also be a flow control valve (e.g., a proportional control valve) that directs a portion of the fuel 67 and or controls the flow of the fuel 67 through the fuel heat exchanger 211 and the fuel bypass line 215. The fuel bypass valve 214 may be any suitable valve including, for example, an electrically operable valve, a hydraulically operable valve, or a pneumatically operable valve. When the fuel bypass valve 214 is hydraulically operable, the hydraulic fluid may be suitable fluids of the turbine engine 10 including, for example, the fuel 67, lubrication oil, and the like.

The thermal transport system 200 includes a heat transfer loop 225 that thermally couples the condenser 204 with the fuel heat exchanger 211 to transfer heat from the condenser 204 with the fuel heat exchanger 211. More specifically, the water 274 flows through the heat transfer loop 225 to transfer heat from the condenser 204 to the fuel heat exchanger 211. The heat transfer loop 225 includes a supply line 230. The supply line 230 is fluidly connected to the line conveying the water 274 between the water pump 208 and the boiler 202. Thus, the supply line 230 is fluidly connected downstream of the water pump 208 and upstream of the boiler 202. As noted above, the water pump 208 directs the separated liquid water 274 through the boiler 202, and, with the location of the water pump 208 relative to the supply line 230, the water pump 208 may also be used to direct the flow of the water 274 through the thermal transport system 200. The water 274 thus flows from the water pump 208 through the supply line 230 to the fuel heat exchanger 211.

Although the exhaust-water mixture 270 has been cooled to a temperature low enough to condense water from the combustion gases 66, the temperature of the water 274 may still be relatively high, such as from one hundred degrees Fahrenheit (100° F.) (thirty-eight degrees Celsius (38° C.)) to two hundred twelve degrees Fahrenheit (212° F.) (one hundred degrees Celsius (100° C.)) and more likely from one hundred fifty degrees Fahrenheit (150° F.) (sixty-six degrees Celsius (66° C.)) to two hundred twelve degrees Fahrenheit (212° F.) (one hundred degrees Celsius (100° C.)). Such temperatures are still higher than the temperature of the fuel 67, particularly, when the fuel is a cryogenic liquid fuel, such as hydrogen fuel, stored in the fuel tank 82 at cryogenic temperatures. Thus, as the water 274 flows through the fuel heat exchanger 211, the heat from the water 274 is transferred from the water 274 to the fuel 67, and the fuel 67 absorbs the heat from the water 274. The fuel 67 is thus heated and may be vaporized by the heat from the water 274 and the water 274 is cooled.

The water 274 then flows from the fuel heat exchanger 211 back to the boiler 202 where the water 274 can then be heated to form the steam 276 in the manner discussed above. The thermal transport system 200 thus includes a return line 226 through which the water 274 flows from the fuel heat exchanger 211 and into the boiler 202. In FIG. 2, the return line 226 is shown as being fluidly connected to the boiler 202, but, alternatively, the return line 226 may be fluidly connected to a water line upstream of the boiler 202, such as a waterline directly connecting the water pump 208 with the boiler 202.

The water 274, having been cooled by the fuel 67, may be preheated before flowing into the boiler 202. A preheat heat exchanger may be located in the return line 226 to preheat the water 274. In this embodiment, the preheat heat exchanger is the condenser 204. The thermal transport system 200 includes an intermediate return line 226 fluidly connecting the fuel heat exchanger 211 to a flow passage within the condenser 204, and the return line 226 fluidly connects the flow passage of the condenser 204 to the boiler 202. The water 274 may thus be preheated by the combustion gases 66 flowing through the condenser 204 before being introduced into the boiler 202.

The heat transfer loop 225 may be selectively operable such that the heat transfer loop 225 may be isolated or such that only a portion of the water 274 flows through the heat transfer loop 225. The heat transfer loop 225 includes a selector valve 228 located in the water line between the water pump 208 and the boiler 202. The selector valve 228 is operable to open and to direct the water 274 through the supply line 230 and to the fuel heat exchanger 211. The selector valve 228 may be any suitable valve including a three-way valve. The selector valve 228 may also be a flow control valve (e.g., a proportional control valve) that directs a portion of the water 274 and or controls the flow of the water 274 through the heat transfer loop 225. As with the fuel bypass valve 214 discussed above, the selector valve 228 may be an electrically operable valve, a hydraulically operable valve, or a pneumatically operable valve.

The water 274 is used as the heat transfer medium of the heat transfer loop 225 of this embodiment. To avoid freezing the water 274, the thermal transport system 200 includes a plurality of heaters, including a first heater 232, a second heater 234, and a third heater 236. Any suitable heater may be used including, for example, one or more electrical resistance heaters, a catalytic heater, or a burner. In some environments, startup of the turbine engine 10 may occur at cold temperatures (e.g., as low as negative forty degrees Fahrenheit (−40° F.) (negative forty degrees Celsius (−40° C.))). At startup, the turbine engine 10 and, more specifically, the combustor 26, has not begun to operate and, thus, the components in the hot gas path 78 (FIG. 1) are closer to ambient conditions than their operational temperatures. With the components of the thermal system 100 and/or the thermal transport system 200 at these cold temperatures, the water 274 within the thermal system 100 and the thermal transport system 200 may freeze when the water 274 comes into contact with these components. To avoid such freezing, the heaters 232, 234, 236 are used to increase the temperature of these components above the freezing point of water (thirty-two degrees Fahrenheit (32° F.) (zero degrees Celsius (0° C.))), such as from thirty-five degrees Fahrenheit (35° F.) (one degree Celsius (1° C.)) to fifty degrees Fahrenheit (50° F.) (ten degrees Celsius (10° C.)). The first heater 232 may be located in the fuel heat exchanger 211 and used to raise the temperature of the fuel heat exchanger 211. The second heater 234 may be located in the water separator 206 and used to raise the temperature of the water separator 206. The third heater 236 may be located in the condenser 204 and used to raise the temperature of the condenser 204.

One or more temperature sensors (e.g., a first temperature sensor 240, a second temperature sensor 242, a third temperature sensor 244, and a fourth temperature sensor 246) may be used with the heaters 232, 234, 236 to provide input to operate the heaters 232, 234, 236 to heat the components as discussed above. The second temperature sensor 242 may be located within the fuel heat exchanger 211 and used to detect the temperature of the fuel heat exchanger 211. The second temperature sensor 242 may be communicatively coupled to the first heater 232 and, thus, provides input to operate the first heater 232 based on the temperatures sensed by the second temperature sensor 242. Similarly, the fourth temperature sensor 246 is located within the condenser 204 and may be used to detect the temperature of the condenser 204. The third heater 236 may be operated to increase the temperature of the condenser 204 based on the temperature sensed by the fourth temperature sensor 246. The first heater 232 and the third heater 236 may thus be operated to increase the temperature of the fuel heat exchanger 211 and the third heater 236, respectively, to increase the temperatures of these components, as discussed above.

When the temperatures of the fuel heat exchanger 211 and the condenser 204 have increased sufficiently, the water 274 may be circulated through the water line connecting the water separator 206 to the boiler 202 and the heat transfer loop 225. The water 274 may be initially heated within the water separator 206 by the second heater 234. The first temperature sensor 240 may be located in the supply line 230 to determine the temperature of the supply line 230 and the water 274 flowing therein. Similarly, the third temperature sensor 244 may be located in a water line positioned downstream of the water separator 206 and upstream of the boiler 202 to determine the temperature of the water line and the water 274 flowing therein. The second heater 234 positioned in the water separator 206 may be used to increase the temperature of the water separator 206 and also the water 274 before flowing through the thermal system 100 and the thermal transport system 200. The first temperature sensor 240 and the third temperature sensor 244 may thus be used to monitor the temperature of the water 274 and to provide input to operate the heaters 232, 234, 236 based on these temperatures.

When the fuel 67 is a cryogenic fuel, the fuel 67 may be directed through the fuel bypass line 215 during startup operations to avoid cooling the fuel heat exchanger 211 and negating the effects of the first heater 232. As the water 274 increases in temperature, as detected by, for example, the first temperature sensor 240, the fuel bypass valve 214 may be operated to slowly introduce the fuel 67 into the fuel heat exchanger 211.

A method of starting-up the turbine engine 10 may start with the steam injection system off due to the potential for sub-freezing temperatures. The fuel bypass valve 214 may be positioned to bypass the fuel heat exchanger 211 and have fuel 67 flow through the fuel bypass line 215. The selector valve 228 is also positioned to direct the water 274 to the boiler 202 and to bypass the heat transfer loop 225. The turbine engine 10 is started with the water pump 208 off. The turbine engine 10 is brought up to idle using, for example, a starter motor. Using the second temperature sensor 242, the temperature of the fuel heat exchanger 211 is measured. If the temperature of the fuel heat exchanger 211 is not above a heater threshold temperature, the first heater 232 is used to heat the fuel heat exchanger 211 to the temperatures discussed above. Preferably, the heater threshold temperature is greater than the freezing temperature of water (e.g., greater than thirty-two degrees Fahrenheit (32° F.) (zero degrees Celsius (0° C.))), such as from thirty-five degrees Fahrenheit (35° F.) (one degree Celsius (1° C.)) to fifty degrees Fahrenheit (50° F.) (ten degrees Celsius (10° C.)). If (or once) the temperature of the fuel heat exchanger 211 reaches the heater threshold temperature, the water pump 208 and/or the selector valve 228 is modulated (controlled) to send at least some of the water 274 through the heat transfer loop 225.

Once the water 274, flowing through the fuel heat exchanger 211, is above a minimum threshold as measured by the first temperature sensor 240, the fuel bypass valve 214 is used to modulate (i.e., control) the flow of fuel 67 into the fuel heat exchanger 211. The fuel 67 may be modulated using the fuel bypass valve 214 to maintain the water 274 above the minimum threshold temperature. The water 274 is preferably at least eighty degrees Fahrenheit (80° F.) (twenty-six degrees Celsius (26° C.)) before the fuel 67 is introduced into the fuel heat exchanger to prevent instant freezing of the water 274, and thus the minimum threshold may be, for example eighty degrees Fahrenheit (80° F.) (twenty-six degrees Celsius (26° C.)) or more, such as, preferably, from eighty degrees Fahrenheit (80° F.) (twenty-six degrees Celsius (26° C.)) to one hundred sixty degrees Fahrenheit (160° F.) (seventy-one degrees Celsius (71° C.)). A water 274 temperature at the inlet to the fuel heat exchanger 211 of one hundred sixty degrees Fahrenheit (160° F.) (seventy-one degrees Celsius (71° C.)) or less minimize the potential foil boiling at altitude. As the temperature of the water 274 increases due to operation of the turbine engine 10, the selector valve 228 and/or the water pump 208 may be controlled to increase the flow of the water 274 through the thermal transport system 200 to a maximum position. The fuel bypass valve 214 may be used to modulate the fuel 67 flowing into the fuel heat exchanger 211 as the flow of water 274 flowing through the heat transfer loop 225 is increased. The flow of the water 274 and the flow of the fuel 67 are increased until the turbine engine 10 reaches a full idle operation.

Once the combustor 26 is producing the combustion gases 66, the condenser 204 and the water separator 206 will have these hot combustion gases 66 flowing therethrough, providing heat to these components. During the start-up sequence, particularly for start-up when the turbine engine 10 has been exposed to sub-freezing temperatures while shutdown, the second heater 234 and the third heater 236 may be used to heat the water separator 206 and the condenser 204, respectively, to temperatures above the freezing point of water (thirty-two degrees Fahrenheit (32° F.)), such as from thirty-five degrees Fahrenheit (35° F.) (one degree Celsius (1° C.)) to fifty degrees Fahrenheit (50° F.) (ten degrees Celsius (10° C.)). The method of starting-up the turbine engine 10, thus may also include, using the fourth temperature sensor 246 to measure the temperature of the condenser 204. If the temperature of the condenser 204 is not above a heater threshold temperature (discussed above), the fourth temperature sensor 246 is used to heat the condenser 204 to the temperatures discussed above. If (or once) the temperature of the condenser 204 reaches the heater threshold temperature, the turbine engine 10 can be started, such as by igniting the fuel 67 in the combustor 26. Once the combustor ignition has occurred, the second heater 234 and the third heater 236 may be turned off. In some embodiments, the third temperature sensor 244, positioned in the water line fluidly connecting the water separator 206 with the water pump 208, can be used to control the second heater 234 during the startup sequence and determine when to turn off the second heater 234.

A method of shutting down the turbine engine 10 may include decelerating the turbine engine 10 to ground idle thrust. Then, the fuel bypass valve 214 is positioned to bypass the fuel 67 around the fuel heat exchanger 211 and through the fuel bypass line 215. The selector valve 228 is then positioned to direct the water 274 directly to the boiler 202, bypassing the heat transfer loop 225. The water pump 208 is then shut off. The combustion gases 66 continue to flow through the hot gas path 78 with the water pump 208 shut off allowing the condenser 204 and the water separator 206 to be dried out at temperatures above freezing. Once dry, the pump 86 that pumps the fuel 67 from the fuel tank 82, through the fuel delivery assembly 84, can be shut off to shut down the turbine engine 10.

As noted above, the engine controller 220 is configured to operate various aspects of the turbine engine 10, including, in this embodiment, the components described in the methods above. Accordingly, in some embodiments, the engine controller 220 is configured to execute the steps of the method discussed above. More specifically, for example, the processor 222 may execute a sequence of instructions stored on the memory 224 to operate the turbine engine 10 in the manner described above.

In at least one example embodiment, the turbine engine 10 includes a plurality of elongated delivery devices 280 in fluid communication with the compressor section 21. For example, the plurality of elongated delivery devices 280 may be in fluid communication with the HPC 24, the LPC 22, or both the HPC 24 and the LPC 22 of the turbomachine 16. The plurality of elongated delivery devices 280 may be configured to deliver a fluid to a surface of a desired component of the turbine engine 10. In at least one example embodiment, the desired component may be a heat exchanger of the turbine engine 10, such as the condenser 204 shown in FIG. 2.

In other example embodiments, the plurality of elongated delivery devices 280 may be positioned elsewhere within the turbine engine 10. For example, the plurality of elongated delivery devices 280 may be positioned in fluid communication with any component of the turbine engine 10 that may generate ice when exposed to an airflow. The airflow may include the bypass air 62, the combustion gases 66, or a combination thereof.

In at least one example embodiment, the fluid delivered to the desired component includes a vapor configured to de-ice the desired component of the turbine engine 10. For example, the fluid may be bleed air delivered from the compressor section 21 via the plurality of elongated delivery devices 280 to the desired component to prevent the generation of ice or frost on the component. Additionally, the bleed air may wash over the surface of the desired component to prevent re-solidification of ice or frost on the desired component. After washing over the desired component, the bleed air may then be discharged into an external flow stream, such as through the fan bypass nozzle 76 (shown in FIGS. 1-2).

In at least one example embodiment, a valve 285 is fluidly coupled between the plurality of elongated delivery devices 280 and the compressor section 21. For example, the valve 285 may fluidly coupled between the HPC 24 and the plurality of elongated delivery devices 280. Additionally, or alternatively, the valve 285 may be fluidly coupled between the LPC 22 and the plurality of elongated delivery devices 280. The valve 285 is configured to selectively control fluid communication, such as delivery of the bleed air, from the compressor section 21 to the plurality of elongated delivery devices 280.

In other example embodiments, the plurality of elongated delivery devices 280 may deliver the fluid to another heat exchanger or another component within any airflow stream of the turbine engine 10 for cooling or de-icing.

Figure 3A:
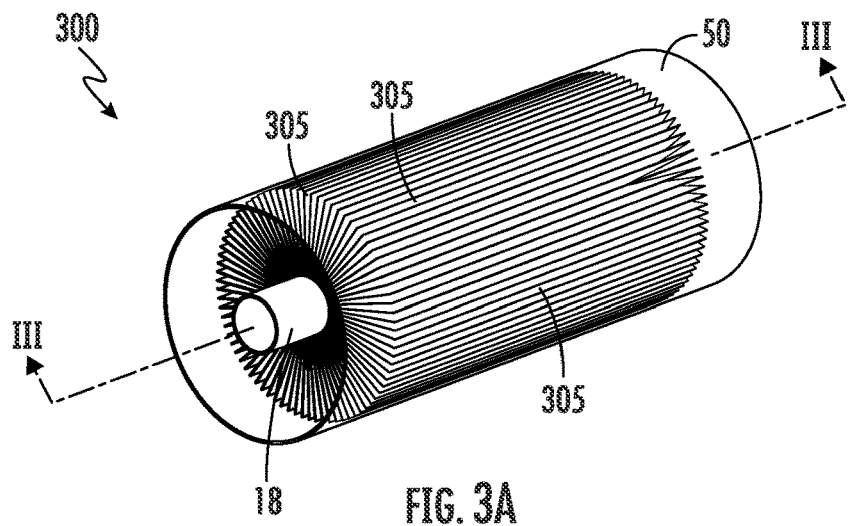
FIG. 3A is a perspective view of a heat exchanger according to an exemplary embodiment of the present disclosure.
Figure 3B:
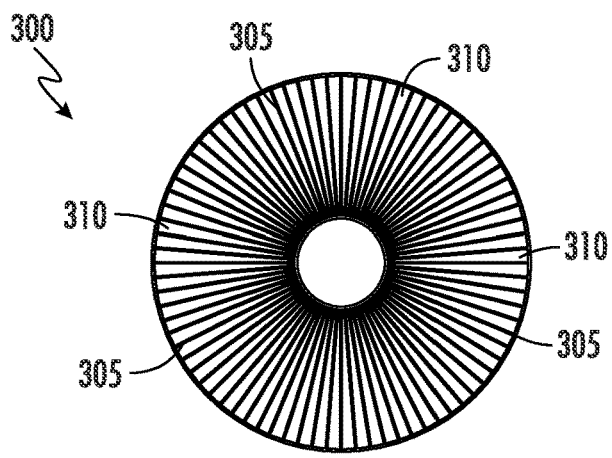
FIG. 3B is a front view of the heat exchanger of FIG. 3A according to an exemplary embodiment of the present disclosure.
Figure 3C:
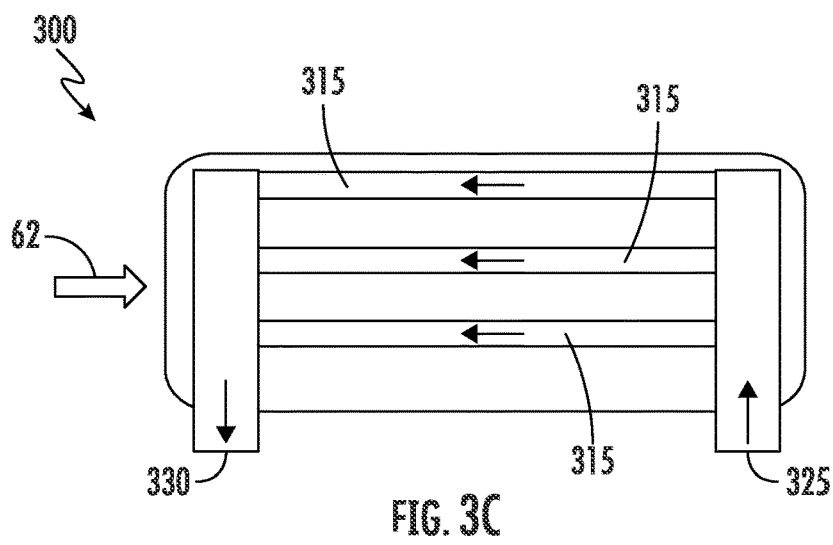
FIG. 3C is a side cross-sectional view of the heat exchanger of FIG. 3A along line III-III according to an exemplary embodiment of the present disclosure.

FIG. 3A is a perspective view of a heat exchanger 300 according to an exemplary embodiment of the present disclosure. FIG. 3B is a front view of the heat exchanger 300 of FIG. 3A according to an exemplary embodiment of the present disclosure. FIG. 3C is a side cross-sectional view of the heat exchanger 300 of FIG. 3A along line III-III according to an exemplary embodiment of the present disclosure.

In at least one example embodiment, the turbine engine 10 includes the heat exchanger 300 disposed in an airflow passage. For example, the heat exchanger 300 may be disposed within the bypass airflow passage 56 shown in FIGS. 1-2. In such embodiments, the heat exchanger 300 may be positioned between the outer casing 18 and the nacelle 50 of the turbine engine 10. Moreover, the heat exchanger 300 may be incorporated into the thermal system 100 of the turbine engine 10 as the condenser 204, as described above with respect to FIG. 2.

In at least one example embodiment, the heat exchanger 300 includes a plurality of plates 305. As shown in FIGS. 3A-3B, the heat exchanger 300 may include an annular heat exchanger disposed in the bypass airflow passage 56. In such embodiments, the plurality of plates 305 may be disposed circumferentially within the bypass airflow passage 56.

With reference to FIG. 3C, each of the plurality of plates 305 define a plurality of fluid pathways 315 configured to be in fluid communication with the thermal system 100. For example, the heat exchanger 300 may be incorporated as the condenser 204 shown in FIG. 2. The heat exchanger 300 also defines a plurality of fluid channels 310 between the plurality of plates 305, as shown in FIGS. 3A-3B. The plurality of fluid channels 310 are in fluid communication with the bypass airflow passage 56 such that the bypass air 62 may flow through the plurality of fluid channels 310.

Referring again to FIG. 3C, each of the plurality of plates 305 of the heat exchanger 300 include a fluid inlet 325 and a fluid outlet 330 in fluid communication with the plurality of fluid pathways 315. The heat exchanger 300 is configured to cool the fluid received through the fluid inlet 325 and discharge the cooled fluid through the fluid outlet 330. For example, as the fluid flows through the plurality of fluid pathways 315 from the fluid inlet 325, the bypass air 62 flows through the plurality of fluid channels 310 and absorbs heat from the fluid within the plurality of fluid pathways 315. The cooled fluid is then discharged from the plurality of fluid pathways 315 through the fluid outlet 330, and the bypass air 62 is discharged from the turbine engine 10, such as through the fan bypass nozzle 76.

In at least one example embodiment, such as discussed above with respect to the condenser 204 shown in FIG. 2, the heat exchanger 300 is configured to cool or remove heat from the combustion gases 66 received from the boiler 202. For example, the heat exchanger 300 may receive the combustion gases 66 through the fluid inlet 325 and, as the bypass air 62 flows through the plurality of fluid channels 310, the bypass air 62 may cool the combustion gases 66 flowing through the plurality of fluid pathways 315. The combustion gases 66 may be condensed into the water 274 by the heat exchanger 300 to form the exhaust-water mixture 270, and the exhaust-water mixture 270 may be discharged from the fluid outlet 330 to the water separator 206, as discussed above with respect to FIG. 2.

Figure 4A:
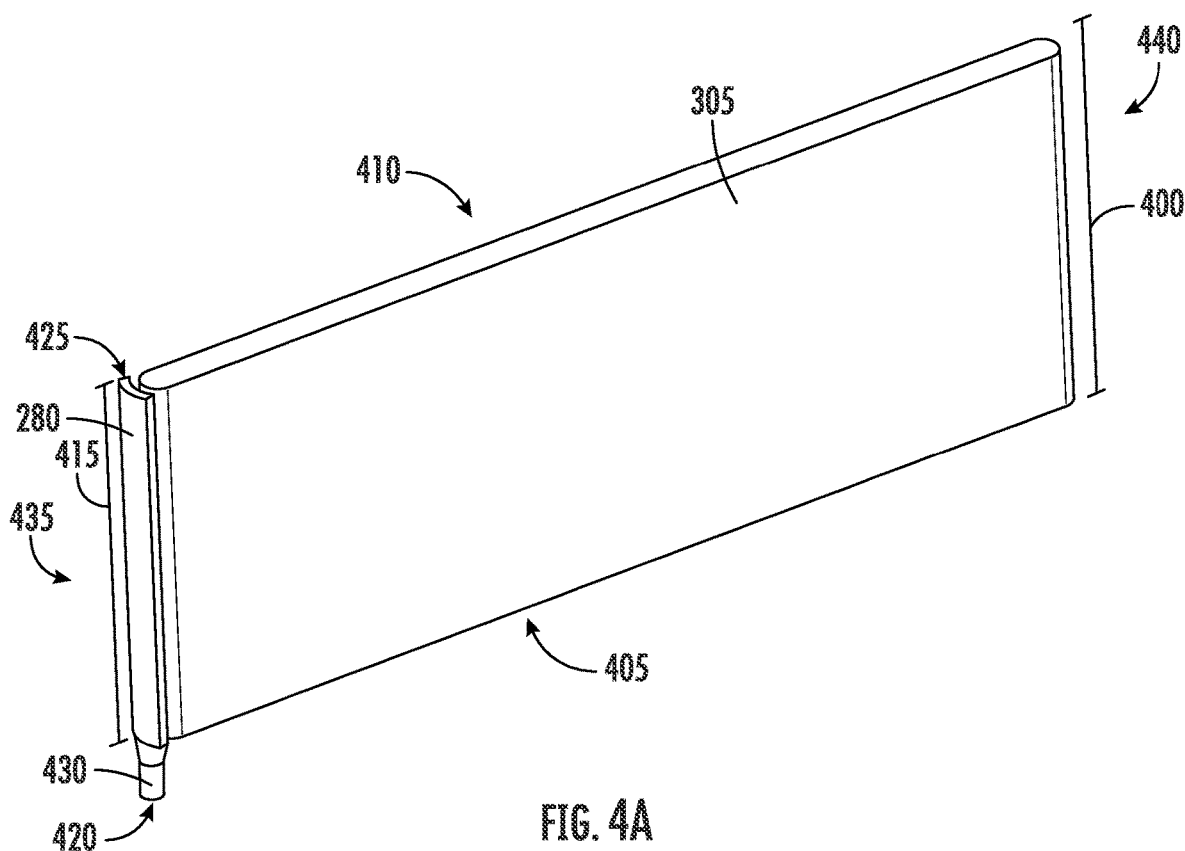
FIG. 4A is a side, perspective view of a portion of the heat exchanger of FIGS. 3A-3C and an elongated delivery device according to an exemplary embodiment of the present disclosure.
Figure 4B:
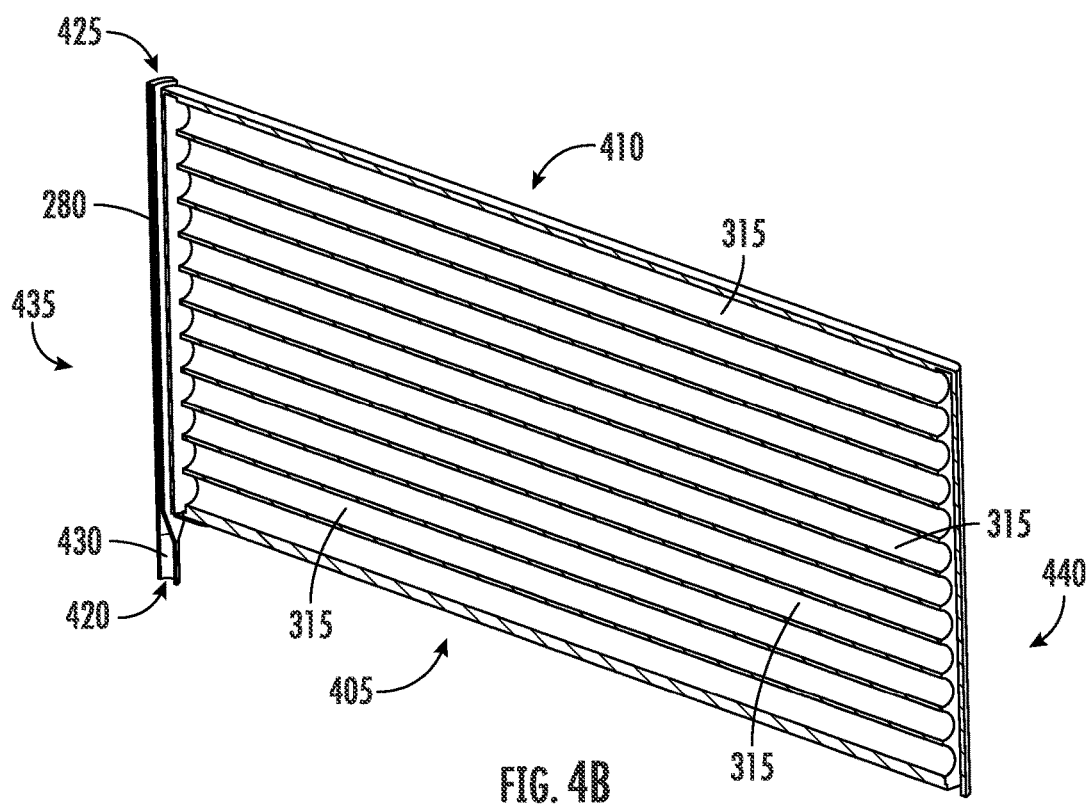
FIG. 4B is a perspective cross-sectional view of the heat exchanger and the elongated delivery device of FIG. 4A according to an exemplary embodiment of the present disclosure.

FIG. 4A is a side, perspective view of one of the plurality of plates 305 of the heat exchanger 300 of FIGS. 3A-3C and one of the plurality of elongated delivery devices 280 according to an exemplary embodiment of the present disclosure. FIG. 4B is a perspective cross-sectional view of one of the plurality of plates 305 of the heat exchanger 300 and one of the plurality of elongated delivery devices 280 of FIG. 4A according to an exemplary embodiment of the present disclosure.

Each of the plurality of plates 305 may have a plate height 400 extending between a first plate side 405 and a second plate side 410 opposite the first plate side 405. Additionally, each of the plurality of elongated delivery devices 280 may have a delivery device length 415 extending between a first end, or an inlet end 420, and a second end 425 opposite the inlet end 420. The delivery device length 415 may be parallel to the plate height 400. In at least one example embodiment, the delivery device length 415 is equal to the plate height 400. In other example embodiments, the delivery device length 415 may be less than or greater than the plate height 400.

In at least one example embodiment, each of the plurality of elongated delivery devices 280 include an inlet nozzle 430 coupled to the inlet end 420. The inlet nozzle 430 may fluidly couple each of the plurality of elongated delivery devices 280 to the compressor section 21. For example, a plurality of conduits or tubes may be fluidly coupled between the compressor section 21 and the inlet nozzle 430. In at least one example embodiment, each of the plurality of elongated delivery devices 280 and the inlet nozzle 430 are integral components. Moreover, each of the plurality of elongated delivery devices 280 and the inlet nozzle 430 may also be integral with the plurality of conduits or tubes in some example embodiments.

In at least one example embodiment, each of the plurality of plates 305 of the heat exchanger 300 extend between a first end or an upstream end 435 and a second end or a downstream end 440. The upstream end 435 and the downstream end 440 are perpendicular to the first plate side 405 and the second plate side 410. Each of the plurality of elongated delivery devices 280 may be adjacent the upstream end 435 of each of the plurality of plates 305.

Figure 5A:
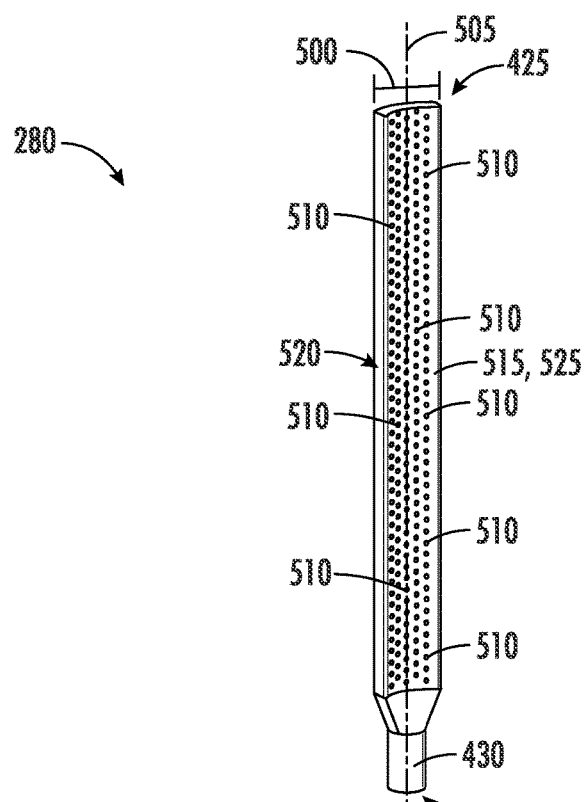
FIG. 5A is a perspective view of the elongated delivery device of FIGS. 4A-4B according to an exemplary embodiment of the present disclosure.
Figure 5B:
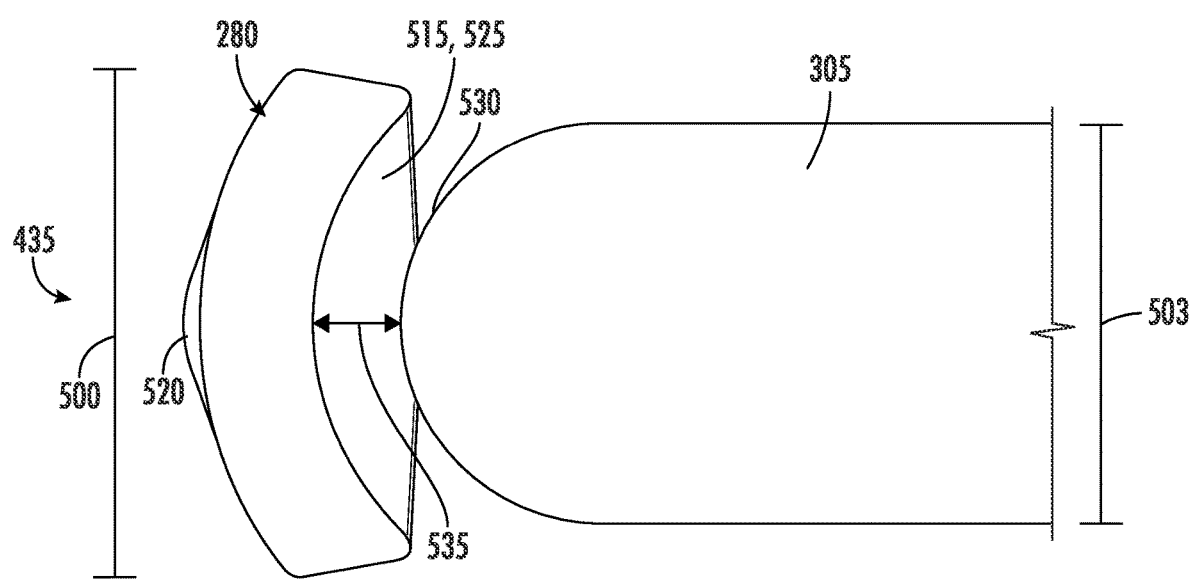
FIG. 5B is a top view of the elongated deliver device relative to a portion of the heat exchanger of FIGS. 4A-4B according to an exemplary embodiment of the present disclosure.

FIG. 5A is a perspective view of one of the plurality of elongated delivery devices 280 of FIGS. 4A-4B according to an exemplary embodiment of the present disclosure. FIG. 5B is a top view of one of the plurality of elongated delivery devices 280 of FIGS. 4A-4B relative to one of the plurality of plates 305 of the heat exchanger 300 according to an exemplary embodiment of the present disclosure.

With reference to FIG. 5A, the plurality of elongated delivery devices 280 may include a delivery device width 500 extending perpendicular to a central axis 505 extending through the plurality of elongated delivery devices 280. The central axis 505 extends parallel to the delivery device length 415. The delivery device width 500 may be constant from the second end 425 towards the inlet end 420. Additionally, the delivery device width 500 may decrease adjacent the inlet end 420. For example, a portion of each of the plurality of elongated delivery devices 280 adjacent the inlet end 420 may taper towards the inlet nozzle 430. As shown in FIG. 5A, the inlet nozzle 430 may include a substantially cylindrical shape. Additionally, each of the plurality of elongated delivery devices 280 may be symmetrical about the central axis 505.

Still referring to FIG. 5A, the plurality of elongated delivery devices 280 may define a plurality of fluid outlets, such as a plurality of perforations 510. Fluid, such bleed air from the compressor section 21, may be delivered from the plurality of elongated delivery devices 280 to the plurality of plates 305 of the heat exchanger 300 through the plurality of perforations 510. Moreover, the plurality of perforations 510 are defined by an interior surface 515 of each of the plurality of elongated delivery devices 280, which faces the plurality of plates 305 as shown in FIG. 5B.

In at least one example embodiment, each of the plurality of elongated delivery devices 280 are configured to deliver a fluid, such as bleed air from the compressor section 21, to a surface of the heat exchanger 700 adjacent the upstream end 435 through the plurality of perforations 510. The fluid is configured to wash over the surface of each of the plurality of plates 305 to de-ice the heat exchanger 300. Moreover, the fluid delivered from the plurality of elongated delivery devices 280 is configured to prevent the generation of ice or frost on the heat exchanger 300 and prevent re-solidification of ice or frost on the heat exchanger 300, as discussed above with respect to FIG. 2.

In at least one example embodiment, the plurality of elongated delivery devices 280 also provide ruggedization to the heat exchanger 300. For example, the plurality of elongated delivery devices 280 protect at least the leading edge of the heat exchanger 300 against foreign or domestic object damage.

With reference to FIG. 5B, the interior surface 515 of the plurality of elongated delivery devices 280 may include a curved surface, such as a first curved surface 525. Additionally, each of the plurality of plates 305 may include a curved surface, such as a second curved surface 530, adjacent the upstream end 435 and facing the plurality of elongated delivery devices 280. A radius of curvature of the first curved surface 525 may correspond to or be complementary to a radius of curvature of the second curved surface 530. For example, the radius of curvature of the first curved surface 525 and the radius of curvature of the second curved surface 530 may be about the same or equal. Moreover, the first curved surface 525 and the second curved surface 530 may be substantially parallel.

In at least one example embodiment, each of the plurality of elongated delivery devices 280 include an exterior surface 520 opposite the interior surface 515. The exterior surface 520 may have a substantially curved surface. For example, a radius of curvature of the exterior surface 520 may correspond to or be complementary to the radius of curvature the first curved surface 525. Additionally, as shown in FIG. 5B, the plurality of elongated delivery devices 280 may generally form a C-shape in cross-section.

In at least one example embodiment, the delivery device width 500 is greater than a plate width 503, as shown in FIG. 5B. The delivery device width 500 may be greater than the plate width 503 to increase an amount of hot air film delivered from the plurality of elongated delivery devices 280 and covering the surface of the plurality of plates 305. For example, the hot air film may cover a greater surface area of the plurality of plates 305. Additionally, the delivery device width 500 may reduce the risk of the hot air film detaching from the surface of the plurality of plates 305.

In other example embodiments, the delivery device width 500 may be less than or equal to the plate width 503, as will be discussed with respect to FIGS. 6A-6B, below.

In at least one example embodiment, the plurality of elongated delivery devices 280 may be spaced apart from the upstream end 435 of the plurality of plates 305 to define a gutter or a gap 535. For example, the upstream end 435 of each of the plurality of plates 305 includes a radius, and the interior surface 515 of each of the plurality of elongated delivery devices 280 may be spaced from the upstream end 435 of the plurality of plates 305 between about 0.2 times the radius to about 2.0 times the radius to define the gap 535. Positioning the plurality of elongated delivery devices 280 closer to the plurality of plates 305, such that the gap 535 shown in FIG. 5B is smaller compared to the gap 635 shown in FIG. 6B, may provide a stronger impingement jet of the fluid delivered to the upstream end 435 of the plurality of plates 305.

Figure 6A:
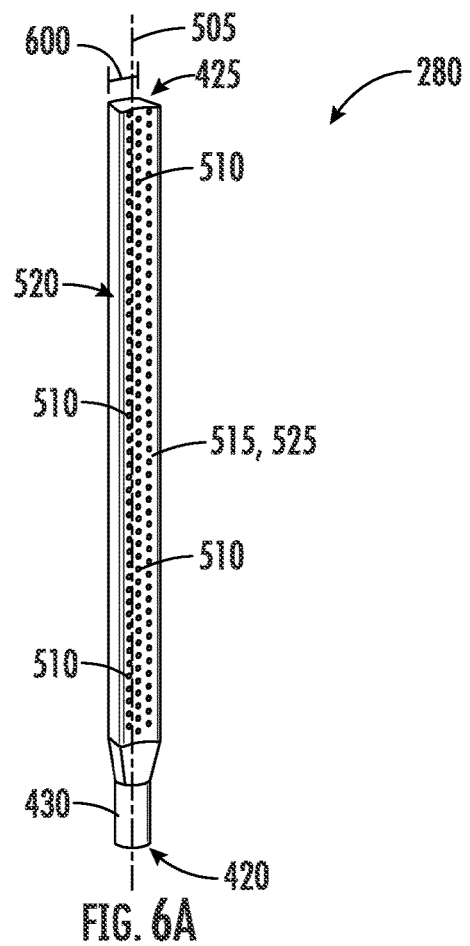
FIG. 6A is a perspective view of the elongated delivery device of FIGS. 4A-4B according to an exemplary embodiment of the present disclosure.

FIG. 6A is a perspective view of one of a plurality of elongated delivery devices 280 of FIGS. 4A-4B according to an exemplary embodiment of the present disclosure. FIG. 6B is a top view of one of the plurality of elongated delivery devices 280 relative to one of the plurality of plates 305 of the heat exchanger 300 of FIGS. 4A-4B according to an exemplary embodiment of the present disclosure.

Figure 6B:
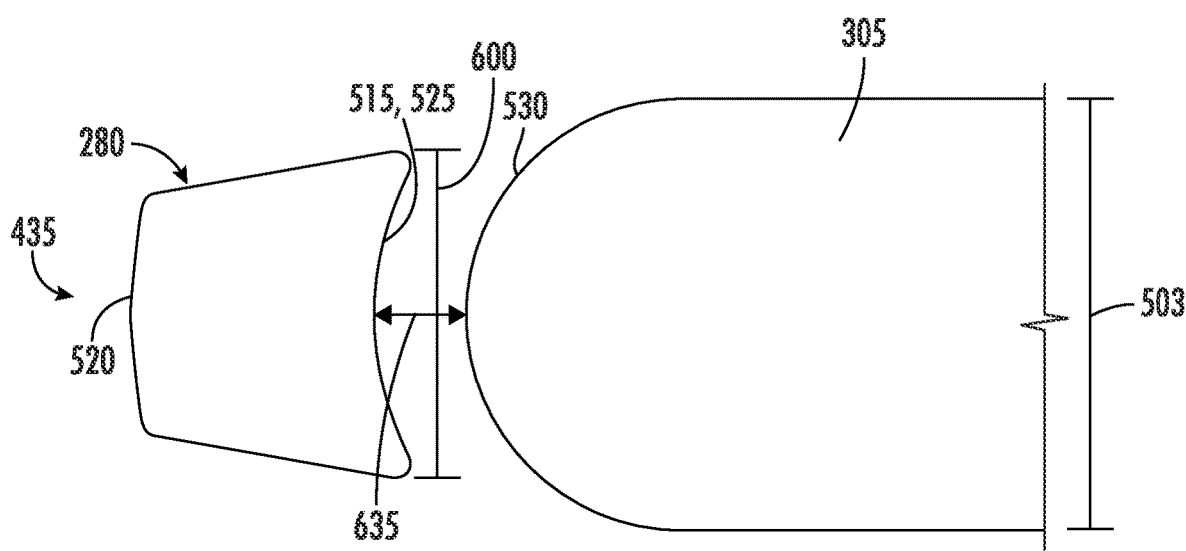
FIG. 6B is a top view of the elongated deliver device relative to a portion of the heat exchanger of FIGS. 4A-4B according to an exemplary embodiment of the present disclosure.

The elongated delivery device of the plurality of elongated delivery devices 280 shown in FIGS. 6A-6B may be similar or analogous to the plurality of elongated delivery devices 280 shown in FIGS. 5A-5B. In at least one example embodiment, each of the plurality of elongated delivery devices 280 include a delivery device width 600. Like the delivery device width 500 described above with respect to FIG. 5A, the delivery device width 600 extends perpendicular to the central axis 505. With reference to FIG. 6B, the delivery device width 600 may be less than the delivery device width 500. Moreover, the delivery device width 600 may be less than the plate width 503. In such embodiments where the delivery device width 600 is less than the plate width 503, blockage by the plurality of elongated delivery devices 280 may be reduced such that there is less pressure loss through the heat exchanger, such as the condenser 204.

In at least one example embodiment, the plurality of elongated delivery devices 280 may also be spaced apart from the upstream end 435 of plurality of plates 305 to define a gap 635. As shown in FIG. 6B, and with reference to FIG. 5B, the gap 635 may be greater than the gap 535. For example, the upstream end 435 of each of the plurality of plates 305 includes a radius, and the interior surface 515 of each of the plurality of elongated delivery devices 280 may be spaced from the upstream end 435 of the plurality of plates 305 between about 0.2 times the radius to about 2.0 times the radius to define the gap 635. In such embodiments where the gap 635 is larger, the increased distance between the plurality of elongated delivery devices 280 and the downstream end 440 of the plurality of plates 305 may allow the flow of the fluid from the plurality of elongated delivery devices 280 to diffuse and provide greater protections against ice accumulation adjacent the upstream end 435 of the plurality of plates 305.

In at least one example embodiment, each of the plurality of elongated delivery devices 280 may have a general polygonal shape in cross-section, as shown in FIG. 6B. For example, the exterior surface 520 of the plurality of elongated delivery devices 280 may have a generally straight shape or an angled shape. In other example embodiments, the plurality of elongated delivery devices 280 may have a substantially cylindrical, rectangular, or triangular shape.

Figure 7A:
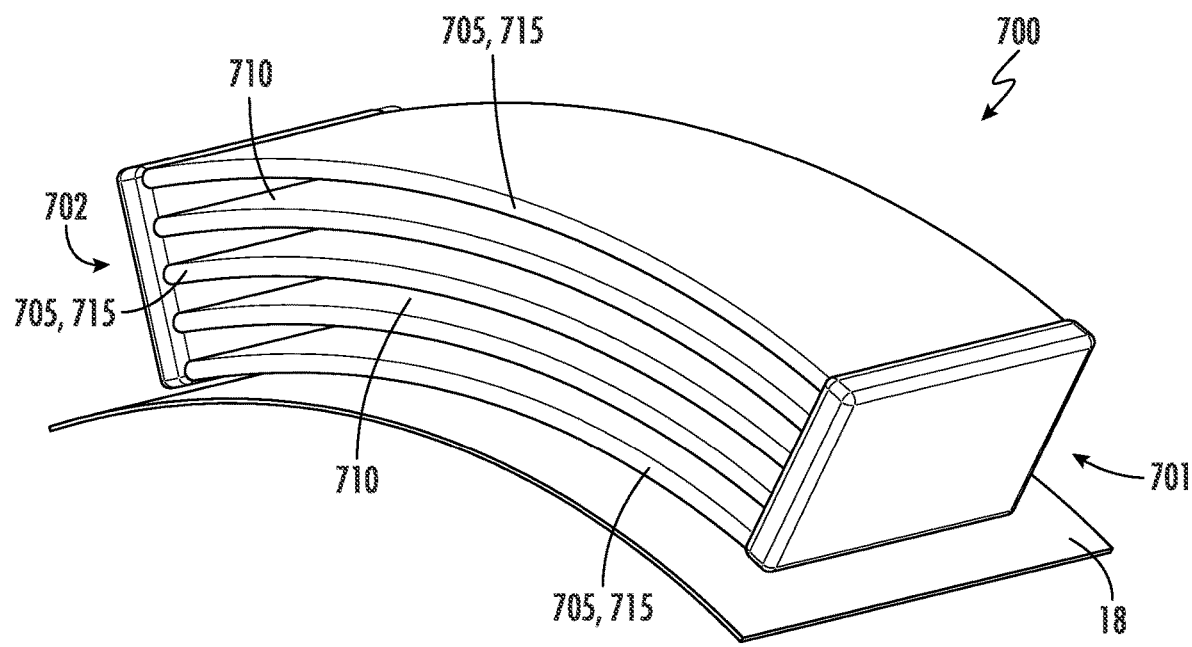
FIG. 7A is a perspective view of a heat exchanger according to an exemplary embodiment of the present disclosure.
Figure 7B:
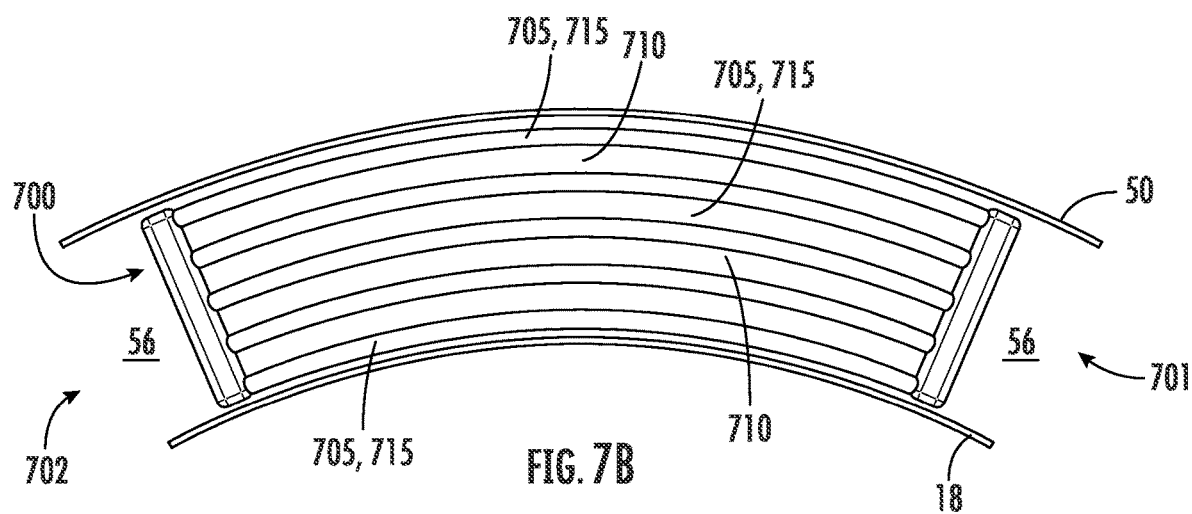
FIG. 7B is a side cross-sectional view of the heat exchanger of FIG. 7A according to an exemplary embodiment of the present disclosure.

FIG. 7A is a perspective view of a heat exchanger 700 according to an exemplary embodiment of the present disclosure. FIG. 7B is a side cross-sectional view of the heat exchanger 700 of FIG. 7A according to an exemplary embodiment of the present disclosure.

The heat exchanger 700 may be configured in a similar manner as the exemplary heat exchanger 300 discussed above with respect to FIGS. 3A-4B. For example, the heat exchanger 700 may be disposed within an airflow passage of the turbine engine 10, such as the bypass airflow passage 56. In such embodiments, the heat exchanger 700 may be between the outer casing 18 and the nacelle 50 of the turbine engine 10. Moreover, the heat exchanger 700 may be incorporated into the thermal system 100 of the turbine engine 10 as the condenser 204 as described above with respect to FIG. 2.

In at least one example embodiment, the heat exchanger 700 includes a plurality of plates 705. As shown in FIGS. 7A-7B, the plurality of plates 705 may be arranged in a stacked relationship. Additionally, the heat exchanger 700 may include a plurality of the heat exchangers 700. In such embodiments, the plurality of the heat exchangers 700 may be disposed circumferentially within and about the bypass airflow passage 56.

The plurality of plates 705 of the heat exchanger 700 define a plurality of fluid channels 710 therebetween. The plurality of fluid channels 710 are configured to be in fluid communication with the bypass airflow passage 56 such that the bypass air 62 may flow through the plurality of fluid channels 710. Additionally, each of the plurality of plates 705 define a plurality of fluid pathways 715 extending between a first end 701 and a second end 702 of the heat exchanger 700. The plurality of fluid pathways 715 may be configured to be in fluid communication with the thermal system 100. For example, the heat exchanger 700 may be incorporated as the condenser shown in FIG. 2. In such embodiments, the plurality of fluid pathways 715 may be configured to receive a fluid through an inlet (not shown) and discharge the fluid through an outlet (not shown). The fluid flowing through the plurality of fluid pathways 715 may be cooled by the bypass air 62 flowing through the plurality of fluid channels 710 and then discharged through the outlet (not shown). Accordingly, the bypass air 62 may absorb heat from the fluid within the plurality of fluid pathways 715. The bypass air 62 may then be discharged from the turbine engine 10, such as through the fan bypass nozzle 76.

In at least one example embodiment, such as discussed above with respect to the condenser 204 shown in FIG. 2, the heat exchanger 700 is configured to cool or remove heat from the combustion gases 66 received from the boiler 202. For example, the plurality of fluid pathways 715 of the heat exchanger 700 may receive the combustion gases 66 and, as the bypass air 62 flows through the plurality of fluid channels 710, the bypass air 62 may cool the combustion gases 66 flowing through the plurality of fluid pathways 715. The combustion gases 66 may be condensed into the water 274 by the heat exchanger 700 to form the exhaust-water mixture 270, and the exhaust-water mixture 270 may be discharged from the heat exchanger 700 to the water separator 206, as discussed above with respect to FIG. 2.

Figure 8A:
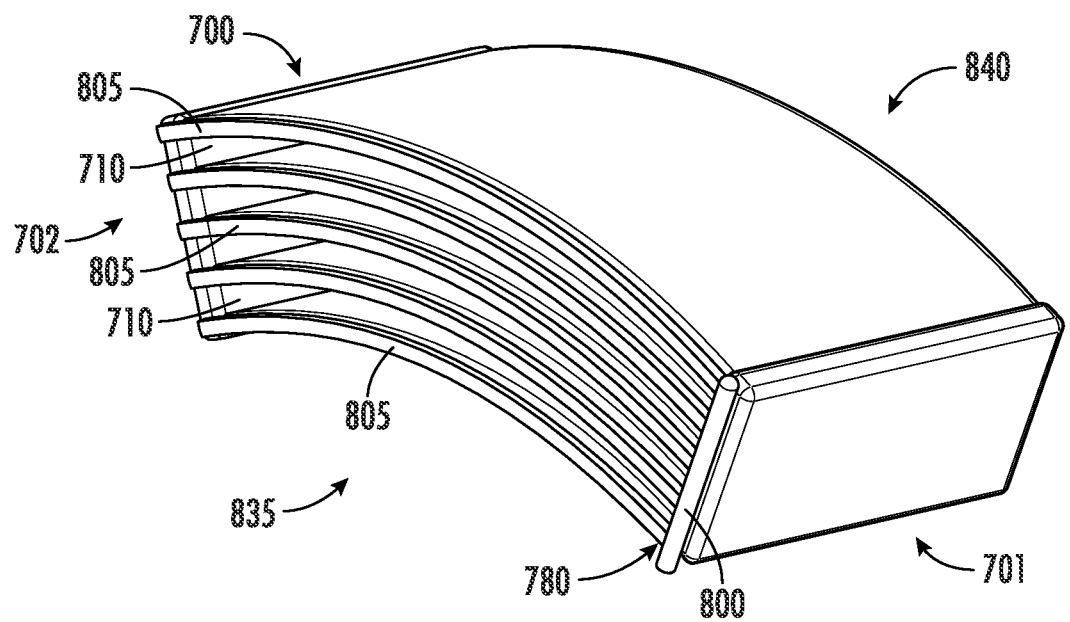
FIG. 8A is a perspective view of the heat exchanger of FIGS. 7A-7B and an elongated delivery device according to an exemplary embodiment of the present disclosure.
Figure 8B:
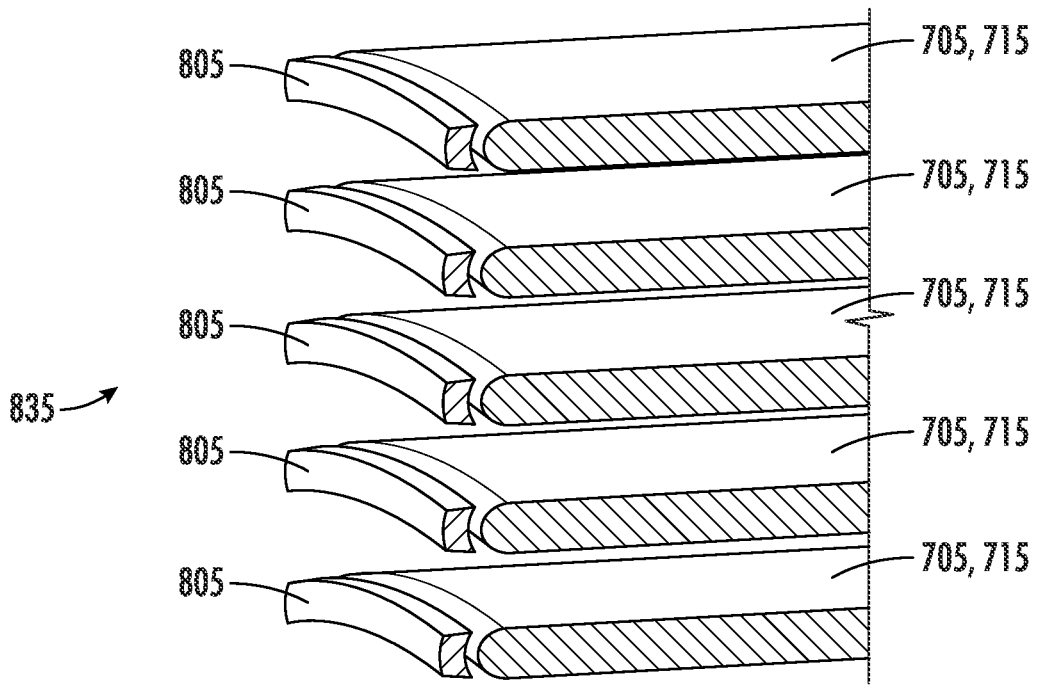
FIG. 8B is a cross-section view of the heat exchanger and the elongated delivery device of FIG. 8A according to an exemplary embodiment of the present disclosure.

FIG. 8A is a perspective view of the heat exchanger 700 of FIGS. 7A-7B and an elongated delivery device of an elongated delivery device 780 according to an exemplary embodiment of the present disclosure. FIG. 8B is a cross-section view of the heat exchanger 700 and the elongated delivery device 780 of FIG. 8A according to an exemplary embodiment of the present disclosure.

In at least one example embodiment, the heat exchanger 700 is configured to receive the bypass air 62 at an upstream end 835 and discharge the bypass air 62 from a downstream end 840 opposite the upstream end 835. For example, the bypass air 62 enters the heat exchanger 700 at the upstream end 835, flows through the plurality of fluid channels 710, and exits the heat exchanger 700 at the upstream end 835. Accordingly, the fluid flowing through the plurality of fluid pathways 715 may be cooled by the bypass air 62 flowing through the plurality of fluid channels 710, as discussed above with respect to FIGS. 7A-7B.

The elongated delivery device 780 may be configured in a similar manner as the plurality of elongated delivery devices 280 discussed above with respect to FIGS. 4A-6B. For example, the elongated delivery device 780 may be fluidly coupled to the compressor section 21 and configured to deliver a fluid, such as bleed air from the compressor section 21, to a surface of the heat exchanger 700 adjacent the upstream end 835. The fluid is configured to wash over the surface of each of the plurality of plates 705 from the upstream end 835 to the downstream end 840 to de-ice the heat exchanger 700. The fluid delivered from the elongated delivery device 780 may also be configured to prevent the generation of ice or frost on the heat exchanger 700 and prevent re-solidification of ice or frost on the heat exchanger 700, as discussed above with respect to FIG. 2. Moreover, in example embodiments including a plurality of the heat exchangers 700, there may be a plurality of the elongated delivery devices 780 such that one of the plurality of elongated delivery devices 780 is adjacent on of the plurality of heat exchangers 700.

In at least one example embodiment, the elongated delivery device 780 includes a first delivery member 800 and a plurality of secondary delivery members 805. As shown in FIG. 8A, the first delivery member 800 may extend along the first end 701 of the heat exchanger 700. For example, the first delivery member 800 may extend in a substantially vertical direction along the first end 701 of the heat exchanger 700. The plurality of secondary delivery members 805 are fluidly coupled to the first delivery member 800 and extend from the first delivery member 800 to the second end 702 of the heat exchanger 700. The plurality of secondary delivery members 805 may extend substantially perpendicularly to the first delivery member 800. Each of the plurality of secondary delivery members 805 are adjacent the upstream end 835 of each of the plurality of plates 705.

Additionally, the plurality of secondary delivery members 805 may have a same shape as a shape of the plurality of plates 305. For example, the plurality of secondary delivery members 805 and the plurality of plates 305 may have a curved shape, as shown in FIG. 8A. In at least one example embodiment, a number of the plurality of secondary delivery members 805 is equal to a number of the plurality of plates 705.

In other example embodiments, the first delivery member 800 may extend along the second end 702 of the heat exchanger 700. In such embodiments, the plurality of secondary delivery members may extend from the first delivery member 800 adjacent the second end 702 to the first end 701 of the heat exchanger 700. In still other example embodiments, the number of the plurality of secondary delivery members 805 may be different from the number of the plurality of plates 705 of the heat exchanger 700. In such embodiments, plurality of secondary delivery members 805 may be positioned adjacent the upstream end 835 of the plurality of plates 705 in an alternating arrangement.

Accordingly, turbine engines may include a heat exchanger assembly for removing and preventing ice or frost formation on components of the turbine engine. For example, in accordance with example embodiments discussed above, the heat exchanger assembly may include a plurality of delivery devices for delivering fluid to such components of the turbine engine for preventing and removing ice or frost. Additionally, the plurality of delivery devices may provide ruggedization such that the plurality of delivery devices may damage to components of the turbine engine.

Further aspects are provided by the subject matter of the following clauses:

A turbine engine, comprising: a turbomachine comprising a compressor section, a combustion section, and a turbine section in serial flow order and together defining a working gas flow path; a thermal system operable with the turbomachine; a heat exchanger in fluid communication with the thermal system; and a plurality of elongated delivery devices in fluid communication with the compressor section of the turbomachine and configured to deliver a fluid from the compressor section to a surface of the heat exchanger.

The turbine engine of any preceding clause, wherein: the heat exchanger comprises a plurality of plates arranged within a bypass airflow passage of the turbine engine; each of the plurality of plates define a plurality of fluid pathways in fluid communication with the thermal system; and the heat exchanger defines a plurality of fluid channels between the plurality of plates, the plurality of fluid channels in fluid communication with the bypass airflow passage.

The turbine engine of any preceding clause, wherein each of the plurality of elongated delivery devices are adjacent an upstream end of each of the plurality of plates of the heat exchanger.

The turbine engine of any preceding clause, wherein each of the plurality of elongated delivery devices comprise a width less than or equal to a width of each of the plurality of plates.

The turbine engine of any preceding clause, wherein: the upstream end of each of the plurality of plates includes a radius; and each of the plurality of elongated delivery devices are spaced from the upstream end of each of the plurality of plates between 0.2 times the radius and about 2.0 times the radius.

The turbine engine of any preceding clause, wherein each of the plurality of elongated delivery devices comprise a width greater than or equal to a width of each of the plurality of plates.

The turbine engine of any preceding clause, wherein: a surface of each of the plurality of elongated delivery devices facing the upstream end of each of the plurality of plates includes a first curved surface; the upstream end of each of the plurality of plates include a second curved surface; and the first curved surface corresponds with the second curved surface.

The turbine engine of any preceding clause, wherein: the heat exchanger comprises an annular heat exchanger; and the plurality of plates are disposed circumferentially within the bypass airflow passage of the turbine engine.

The turbine engine of any preceding clause, wherein the plurality of plates of the heat exchanger are arranged in a stacked relationship and disposed within the bypass airflow passage of the turbine engine.

The turbine engine of any preceding clause, wherein: the heat exchanger comprises a plurality of heat exchangers disposed circumferentially within the bypass airflow passage of the turbine engine; and the plurality of plates of each of the plurality of heat exchangers extend along a length between a first end and a second end opposite the first end.

The turbine engine of any preceding clause, wherein each of the plurality of elongated delivery devices comprise: a first delivery member extending along the first end or the second end of each of the plurality of heat exchangers; and a plurality of second delivery members extending along the length of each of the plurality of plates from the first delivery member to the other of the first end or the second end of each of the plurality of heat exchangers; wherein the plurality of second delivery members extend perpendicular to the first delivery member.

The turbine engine of any preceding clause, wherein: each of the plurality of elongated delivery devices define a plurality of fluid outlets; and each of the plurality of elongated delivery devices are configured to direct the fluid through the plurality of fluid outlets and onto a surface of the heat exchanger to de-ice the heat exchanger.

The turbine engine of any preceding clause, wherein the fluid comprises bleed air from the compressor section.

The turbine engine of any preceding clause, further comprising a conduit fluidly coupling the plurality of elongated delivery devices and the compressor section.

The turbine engine of any preceding clause, further comprising a control valve configured to control fluid communication between the compressor section and the plurality of elongated delivery devices.

The turbine engine of any preceding clause, wherein the plurality of elongated delivery devices are integral with the heat exchanger.

The turbine engine of any preceding clause, wherein the thermal system comprises a steam system.

The turbine engine of any preceding clause, wherein the steam system comprises a water source and a boiler in fluid communication with the water source to receive water, the boiler further in fluid communication with the working gas flow path to receive combustion gases to boil the water and generate steam.

The turbine engine of any preceding clause, wherein the steam system further comprises a steam turbine in fluid communication with boiler to receive the steam from the boiler and to cause the steam turbine to rotate.

The turbine engine of any preceding clause, wherein the turbomachine comprises a shaft rotatable with the steam turbine, and wherein the steam turbine is rotatable with the shaft.

The turbine engine of any preceding clause, wherein the combustion section is fluidly coupled to the steam turbine to receive the steam from the steam turbine and to inject the steam into the combustion section.

The turbine engine of any preceding clause, wherein: the heat exchanger comprises a condenser in fluid communication with the boiler; and the condenser is configured to condense the water from the combustion gases and remove heat from the combustion gases.

A heat exchanger assembly for a turbine engine including a turbomachine having a compressor section and a thermal system operable with the turbomachine, the heat exchanger assembly comprising: a heat exchanger configured to be in fluid communication with the thermal system when the heat exchanger assembly is installed in the turbine engine; and a plurality of elongated delivery devices configured to be in fluid communication with the compressor section of the turbomachine when the heat exchanger assembly is installed in the turbine engine, the plurality of elongated delivery devices positioned to deliver a fluid from the compressor section to a surface of the heat exchanger.

The heat exchanger assembly of any preceding clause, wherein the heat exchanger comprises a plurality of plates.

The heat exchanger assembly of any preceding clause, wherein each of the plurality of elongated delivery devices are adjacent an upstream end of each of the plurality of plates of the heat exchanger.

The heat exchanger assembly of any preceding clause, wherein each of the plurality of elongated delivery devices comprise a width less than or equal to a width of each of the plurality of plates.

The heat exchanger assembly of any preceding clause, wherein: the upstream end of each of the plurality of plates includes a radius; and each of the plurality of elongated delivery devices are spaced from the upstream end of each of the plurality of plates between 0.2 times the radius and 2.0 times the radius.

The heat exchanger assembly of any preceding clause, wherein each of the plurality of elongated delivery devices comprise a width greater than or equal to a width of each of the plurality of plates.

The heat exchanger assembly of any preceding clause, wherein: a surface of each of the plurality of elongated delivery devices facing the upstream end of each of the plurality of plates includes a first curved surface; the upstream end of each of the plurality of plates include a second curved surface; and the first curved surface corresponds with the second curved surface.

The heat exchanger assembly of any preceding clause, wherein: the heat exchanger comprises an annular heat exchanger; and the plurality of plates are disposed circumferentially.

The heat exchanger assembly of any preceding clause, wherein the plurality of plates of the heat exchanger are arranged in a stacked relationship.

The heat exchanger assembly of any preceding clause, wherein: the heat exchanger comprises a plurality of heat exchangers disposed circumferentially within the turbine engine; and the plurality of plates of each of the plurality of heat exchangers extend along a length between a first end and a second end opposite the first end.

The heat exchanger assembly of any preceding clause, wherein each of the plurality of elongated delivery devices comprise: a first delivery member extending along the first end or the second end of each of the plurality of heat exchangers; and a plurality of second delivery members extending along the length of each of the plurality of plates from the first delivery member to the other of the first end or the second end of each of the plurality of heat exchangers; wherein the plurality of second delivery members extend perpendicular to the first delivery member.

The heat exchanger assembly of any preceding clause, wherein: each of the plurality of elongated delivery devices define a plurality of fluid outlets; and each of the plurality of elongated delivery devices are configured to direct the fluid through the plurality of fluid outlets and onto a surface of the heat exchanger to de-ice the heat exchanger.

The at exchanger assembly of any preceding clause, wherein the plurality of elongated delivery devices are integral with the heat exchanger.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A turbine engine, comprising:
   a turbomachine comprising a compressor section, a combustion section, and a turbine section in serial flow order and together defining a working gas flow path;
   a thermal system operable with the turbomachine;
   a heat exchanger in fluid communication with the thermal system and disposed in a bypass airflow passage of the turbine engine; and
   a plurality of elongated delivery devices in fluid communication with the compressor section of the turbomachine and configured to deliver a fluid from the compressor section to a surface of the heat exchanger.

2. The turbine engine of claim 1, wherein:
   the heat exchanger comprises a plurality of plates;
   at least one of the plurality of plates defines a plurality of fluid pathways in fluid communication with the thermal system; and
   the heat exchanger defines a plurality of fluid channels between the plurality of plates, the plurality of fluid channels in fluid communication with the bypass airflow passage.

3. The turbine engine of claim 2, wherein at least one of the plurality of elongated delivery devices is positioned adjacent an upstream end of at least one of the plurality of plates of the heat exchanger.

4. The turbine engine of claim 3, wherein at least one of the plurality of elongated delivery devices has a width less than or equal to a width of at least one of the plurality of plates.

5. The turbine engine of claim 3, wherein:
   the upstream end of at least one of the plurality of plates includes a radius; and
   at least one of the plurality of elongated delivery devices is spaced from the upstream end of at least one of the plurality of plates between 0.2 times the radius and about 2.0 times the radius.

6. The turbine engine of claim 3, wherein at least one of the plurality of elongated delivery devices has a width greater than or equal to a width of each of the plurality of plates.

7. The turbine engine of claim 3, wherein:
a surface of at least one of the plurality of elongated delivery devices facing the upstream end of at least one of the plurality of plates includes a first curved surface;
the upstream end of at least one of the plurality of plates include a second curved surface; and
the first curved surface corresponds with the second curved surface.

8. The turbine engine of claim 2, wherein:
the heat exchanger comprises an annular heat exchanger; and
the plurality of plates is disposed circumferentially within the bypass airflow passage of the turbine engine.

9. The turbine engine of claim 2, wherein the plurality of plates of the heat exchanger is arranged in a stacked relationship and disposed within the bypass airflow passage of the turbine engine.

10. The turbine engine of claim 9, wherein:
the heat exchanger comprises a plurality of heat exchangers disposed circumferentially within the bypass airflow passage of the turbine engine; and
the plurality of plates of at least one of the plurality of heat exchangers extend along a length between a first end and a second end opposite the first end.

11. The turbine engine of claim 10, wherein at least one of the plurality of elongated delivery devices comprises:
a first delivery member extending along the first end or the second end of at least one of the plurality of heat exchangers; and
a plurality of second delivery members extending along the length of at least one of the plurality of plates from the first delivery member to the other of the first end or the second end of at least one of the plurality of heat exchangers;
wherein the plurality of second delivery members extends perpendicular to the first delivery member.

12. The turbine engine of claim 1, wherein:
at least one of the plurality of elongated delivery devices defines a plurality of fluid outlets; and
at least one of the plurality of elongated delivery devices is configured to direct the fluid through the plurality of fluid outlets and onto the surface of the heat exchanger to de-ice the heat exchanger.

13. The turbine engine of claim 1, wherein the thermal system comprises a steam system.

14. The turbine engine of claim 13, wherein the steam system comprises a water source and a boiler in fluid communication with the water source to receive water, the boiler further in fluid communication with the working gas flow path to receive combustion gases to boil the water and generate steam.

15. The turbine engine of claim 14, wherein the steam system further comprises a steam turbine in fluid communication with the boiler to receive the steam from the boiler and to cause the steam turbine to rotate.

16. The turbine engine of claim 15, wherein the turbomachine comprises a shaft rotatable with the steam turbine, and wherein the steam turbine is rotatable with the shaft.

17. The turbine engine of claim 15, wherein the combustion section is fluidly coupled to the steam turbine to receive the steam from the steam turbine and to inject the steam into the combustion section.

18. The turbine engine of claim 14, wherein:
the heat exchanger comprises a condenser in fluid communication with the boiler; and
the condenser is configured to condense the water from the combustion gases and remove heat from the combustion gases.

19. A heat exchanger assembly for a turbine engine, the turbine engine comprising a turbomachine having a compressor section and a thermal system operable with the turbomachine, the heat exchanger assembly comprising:
a heat exchanger configured to be in fluid communication with the thermal system when the heat exchanger assembly is installed in a bypass airflow passage of the turbine engine; and
a plurality of elongated delivery devices configured to be in fluid communication with the compressor section of the turbomachine when the heat exchanger assembly is installed in the turbine engine, the plurality of elongated delivery devices positioned to deliver a fluid from the compressor section to a surface of the heat exchanger.

20. The heat exchanger assembly of claim 19, wherein:
at least one of the plurality of elongated delivery devices defines a plurality of fluid outlets; and
at least one of the plurality of elongated delivery devices is configured to direct the fluid through the plurality of fluid outlets and onto the surface of the heat exchanger to de-ice the heat exchanger.

* * * * *